(12) United States Patent
Karaki et al.

(10) Patent No.: US 6,604,702 B2
(45) Date of Patent: Aug. 12, 2003

(54) METHOD OF AND APPARATUS FOR PROCESSING FILM

(75) Inventors: Hideyuki Karaki, Minamiashigara (JP); Chiaki Suzuki, Minamiashigara (JP); Yoshinobu Misumi, Tokyo (JP); Takayuki Kambara, Minamiashigara (JP); Susumu Sato, Minamiashigara (JP); Nobuyasu Akiyoshi, Minamiashigara (JP); Masazumi Ogawa, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/071,081

(22) Filed: Feb. 11, 2002

(65) Prior Publication Data

US 2002/0109032 A1 Aug. 15, 2002

Related U.S. Application Data

(63) Continuation of application No. 09/427,010, filed on Oct. 26, 1999, now Pat. No. 6,398,153.

(30) Foreign Application Priority Data

Oct. 27, 1998 (JP) ............................................. 10-306072
Feb. 22, 1999 (JP) .............................................. 11-43474

(51) Int. Cl.⁷ ............................................. B65H 19/22
(52) U.S. Cl. .............................. 242/533.4; 242/533.6; 242/545; 242/547
(58) Field of Search .............................. 242/533.4, 545, 242/547, 533.6

(56) References Cited

U.S. PATENT DOCUMENTS

| 5,505,402 A | 4/1996 | Vigneau |
| 5,909,856 A | * 6/1999 | Myer et al. ................. 242/530 |
| 6,129,303 A | 10/2000 | Karaki et al. |

FOREIGN PATENT DOCUMENTS

| EP | 0584583 | 3/1994 |
| EP | 0 685 758 A1 | 12/1995 |
| EP | 0 740 190 A1 | 10/1996 |
| EP | 0 812 664 A2 | 12/1997 |
| EP | 0 913 727 A2 | 5/1999 |
| JP | 60-53868 | 11/1985 |

OTHER PUBLICATIONS

Communication of a Foreign Office Action dated Feb. 8, 2000.

* cited by examiner

Primary Examiner—John Q. Nguyen
(74) Attorney, Agent, or Firm—Sughrue Mion, PLLC

(57) ABSTRACT

An apparatus for processing a film has a cutting mechanism for cutting an elongate film, first and second feed mechanisms disposed on respective opposite sides of the cutting mechanism, an inserting mechanism for inserting an end of the film into a spool, and a cam switching mechanism for changing the timing of operation of the cutting mechanism depending on sized films having various different lengths. The sized films having various different lengths can automatically and easily be inserted into spools with a simple arrangement.

10 Claims, 33 Drawing Sheets

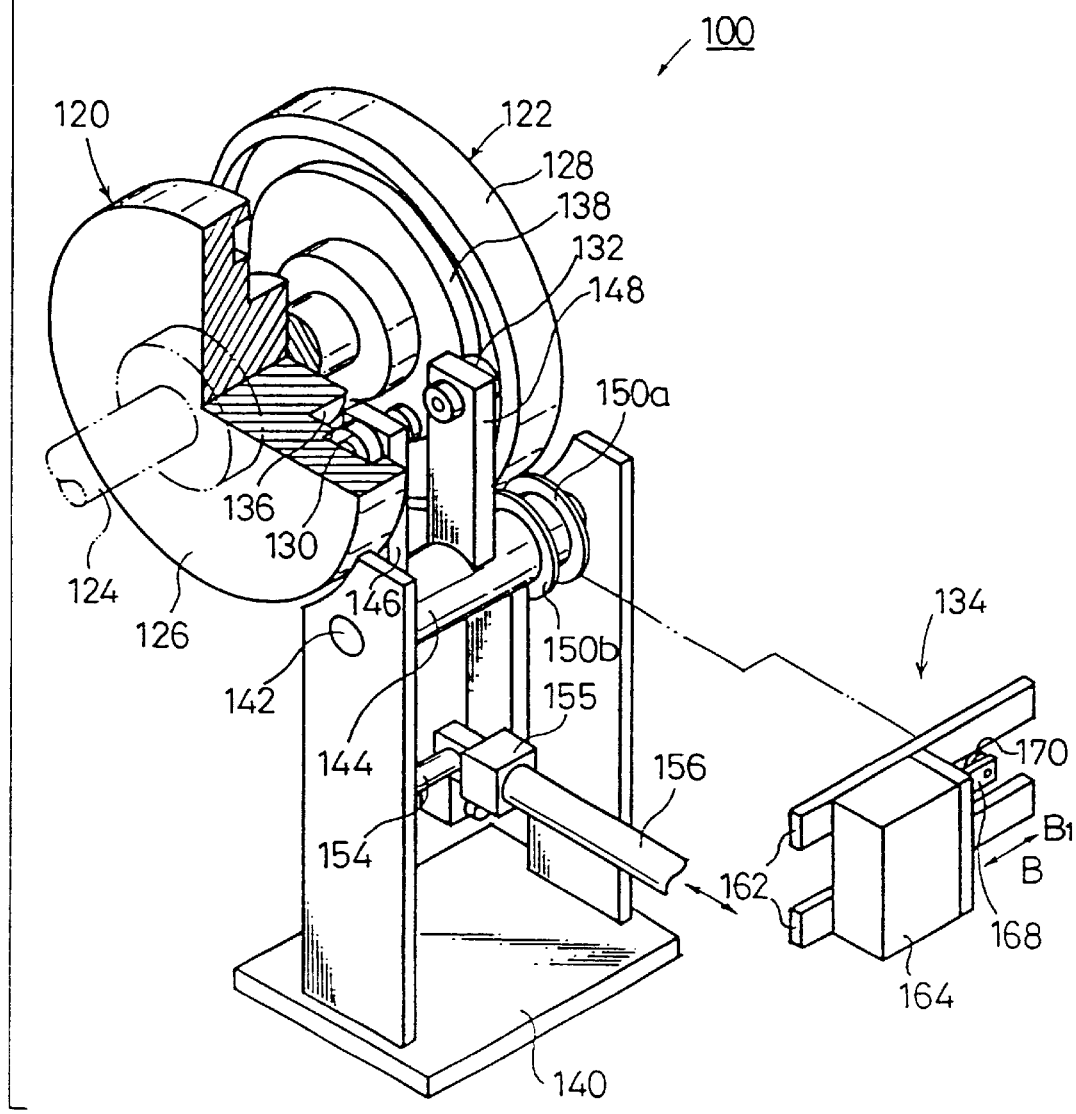

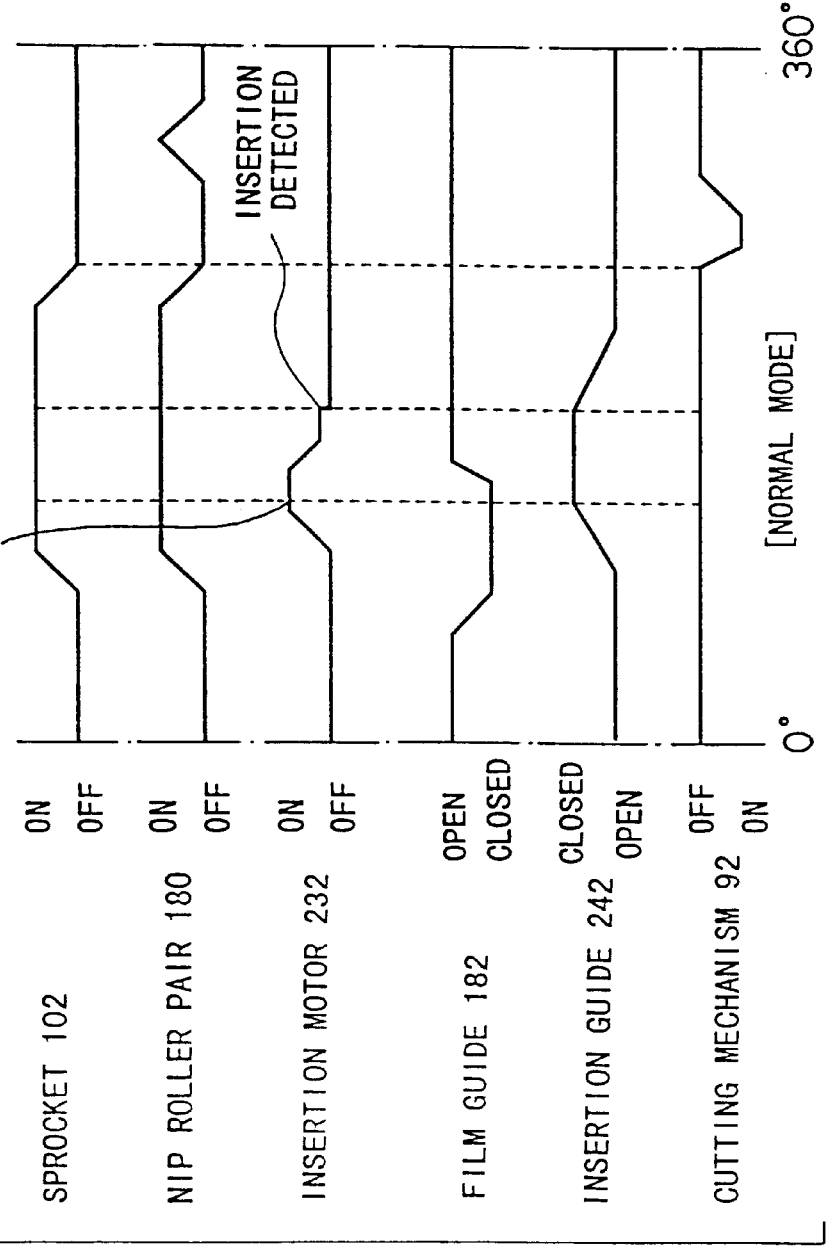

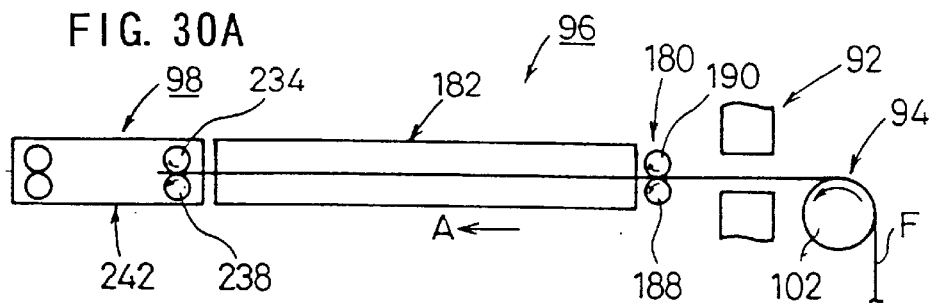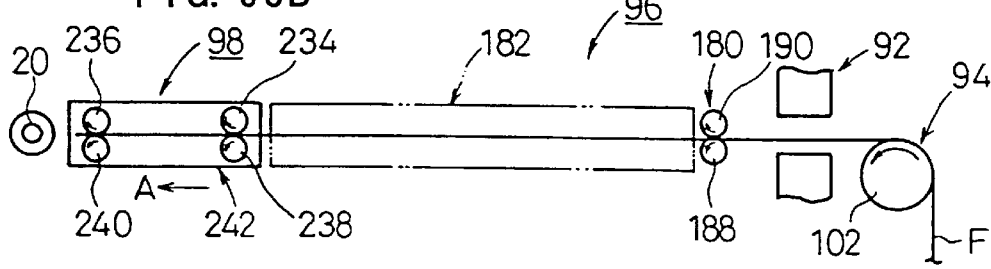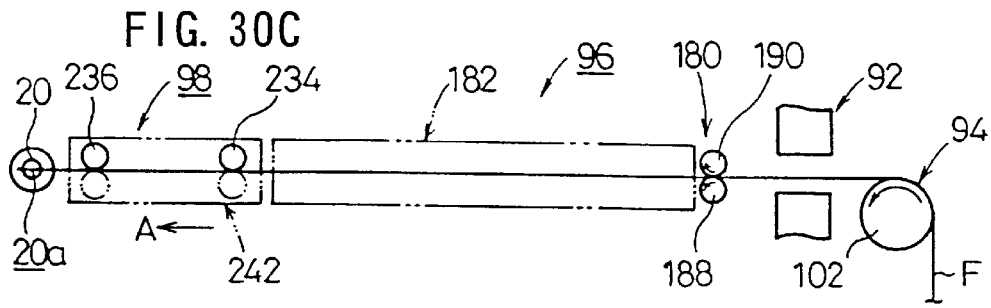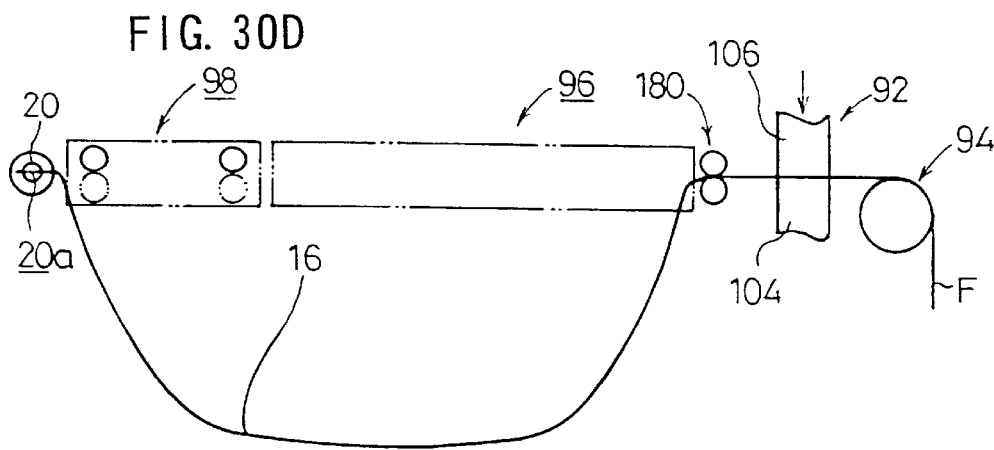

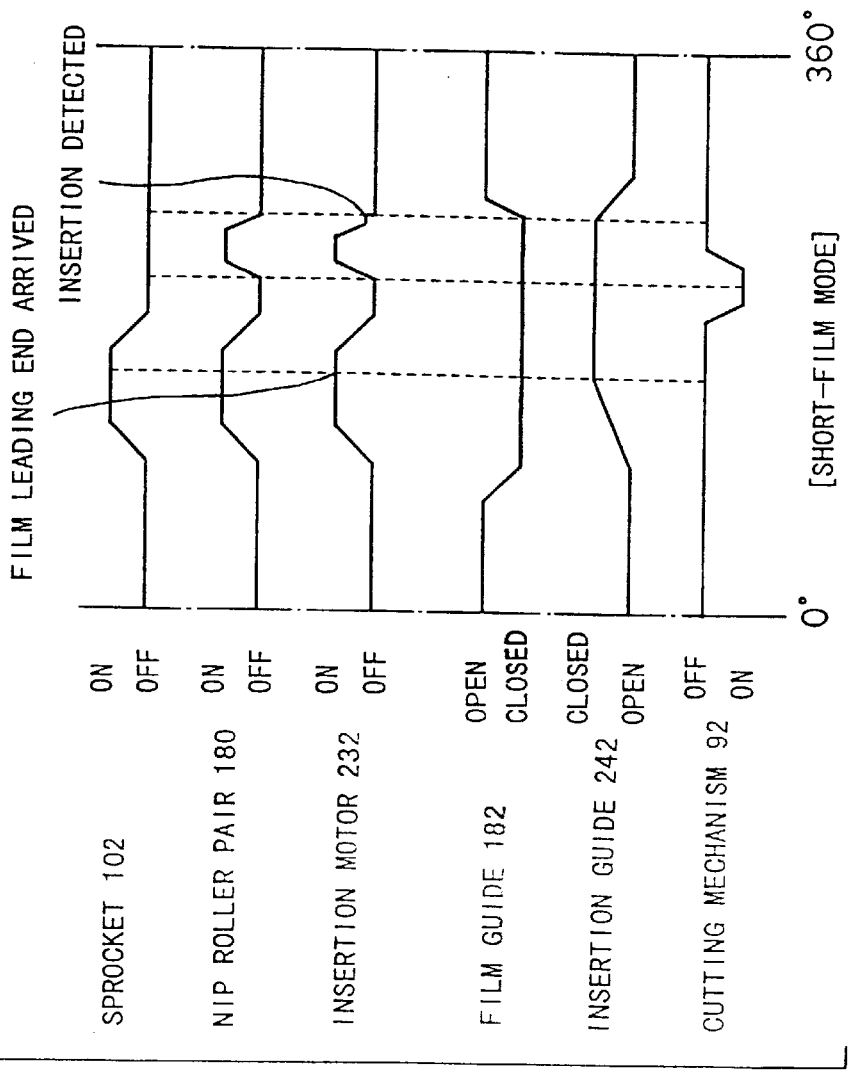

METHOD OF AND APPARATUS FOR PROCESSING FILM

This is a continuation of Application No. 09/427,010 filed Oct. 26, 1999, U.S. Pat. No. 6,398,153, the disclosure of which is incorporated herein by reference.

BACKGROUND OF THE INVENTION

1. Field of the Invention

The present invention relates to a method of and an apparatus for processing an elongate photographic photosensitive film by cutting the elongate photographic photosensitive film to films of various preset lengths, and winding ends of the cut films on spools.

2. Description of the Related Art

For producing and packaging a photographic photosensitive film, it has been customary to perform various steps including the steps of producing a film of given length, winding the film, placing the wound film into a film cartridge, and inserting the film cartridge into a case.

These various steps are carried out by a facility comprising a film supply unit for unwinding a film roll of elongate photographic photosensitive film and cutting (trimming) the unwound elongate photographic photosensitive film to a sized film of given length, a film coiling unit for coiling the sized film of given length on a spool thereby to produce a film coil, a cartridge producing unit for staking a cap on an end of a tubular cartridge blank sheet thereby to produce a cartridge with one open end, an assembling unit for inserting the film coil into the cartridge and staking another cap on the open end of the cartridge thereby to produce an assembled cartridge, and an encasing unit for placing the assembled cartridge into a case and attaching a case cap on an open end of the case thereby to produce a packaged product.

For coiling the sized film of given length on the spool, the elongate photographic photosensitive film is delivered through a cutting mechanism by a feeding mechanism, e.g., a sprocket, which is disposed upstream of the cutting mechanism. Then, after an end of the photographic photosensitive film is inserted into a groove in the spool that is placed in an inserting position in a film inserting unit, the photographic photosensitive film is fed a preset length between the inserting position and a cutting position. When the photographic photosensitive film is cut by the cutting mechanism, a sized film of given length is produced with its end inserted in the spool.

Packaged products contain differently dimensioned films having various numbers of frames. For example, commercially available films with 12, 24, 36 frames are widely used in the market, and those sized films of given length can automatically be wound on spools according to the above process.

It has been desired to manufacture packaged products containing sized films of given length having 10 frames or less, e.g., 5 through 10 frames, which will be presented as gifts to consumers. Since, however, sized films of given length having 10 frames or less are considerably short, the portion of the photographic photosensitive film to be cut off is positioned in the cutting mechanism before the end of the photographic photosensitive film is inserted into the groove in the spool. As a result, the system for producing and packaging photographic photosensitive films need to operate according to different sequences for sized films of given length having 12 frames or more and sized films of given length having 10 frames or less, and cannot easily be arranged to manufacture sized films of given length having 10 frames or less.

The system for producing and packaging photographic photosensitive films may be modified by changing the timing of operation of the actuators of the cutting mechanism, etc. for producing and packaging photographic photosensitive films of differently dimensioned films. However, a control process for switching the actuators would be considerably complex.

If the spool is not accurately positioned when the sized film of given length is wound around the spool, then the end of the film is not reliably inserted into the groove in the spool, resulting in a winding failure. If the sized film of given length is wound around a defective spool which is devoid of a flange, then a defective film product is produced. When such a defective film product is produced, the film which is not defective and wound around the defective spool will be discarded, resulting in an uneconomical waste of the film material. If a defective film of given length is wound around a normal spool, then a defective film product is also produced, resulting in a reduction in the yield of film products.

The film coiling unit for winding a sized film of given length around a spool employs a film winding device as disclosed in Japanese patent publication No. 60-53868, for example. The disclosed film winding device has a turntable rotatably mounted on a support plate by a bearing mounted centrally on the support table, a chuck activating means, a spool positioning joint, and a film winding joint which are disposed at predetermined angular intervals on the support plate. The turntable supports thereon a plurality of spool chuck means each comprising a movable chuck and a fixed chuck.

When a spool is supplied concentrically to the spool chuck means that is aligned with the chuck activating means, a solenoid of the chuck activating means is energized to move the movable chuck toward the spool. The spook is chucked by the spool chuck means, and the turntable is rotated to position the spool in alignment with the spool positioning joint. The spool positioning joint has a spool positioning tooth held against the spool. After a support shaft of the spool positioning joint and a support shaft of the movable chuck are electromagnetically coupled to each other by the energization of an electromagnetic coil, the movable chuck is rotated. When the spool positioning tooth engages in a positioning groove of the spool, the spool is stopped against rotation.

The positioned spool is then positioned at the film winding joint in unison with the spool chuck means. Upon energization of an electromagnetic coil, a support shaft of the film winding joint and the support shaft of the movable chuck are electromagnetically coupled to each other. The spool is rotated by a motor, winding a film whose distal end has been inserted into the spool.

In the above proposed film winding device, the chuck activating means has the solenoid for causing the spool chuck means to removably holding the spool. It has been difficult to energizing the solenoid at a high speed in timed relation to the process of supplying the spool. In the spool positioning joint, when the electromagnetic coil is energized, a magnetic attractive plate is magnetized to attract an attractable plate thereby to electromagnetically couple the support shaft of the spool positioning joint and the support shaft of the movable chuck to each other. However, such an arrangement makes the overall spool positioning joint complex in structure.

In a spool positioning station and a film coiling station, a motor shaft for each station and a spool rotating shaft are driven by a belt (timing belt) and sprockets as a drive means for rotating a spool. Therefore, it is difficult to coil the film at a high speed.

SUMMARY OF THE INVENTION

It is a general object of the present invention to provide a method of and an apparatus for processing a film to produce various films of different lengths and insert ends of the films reliably into grooves in spools, according to a simple control process and with a simple arrangement.

A major object of the present invention to provide a method of and an apparatus for processing a film to wind a sized film of given length smoothly around, a spool for thereby producing a high-quality film product, while reliably preventing a spool positioning failure, etc.

A principal object of the present invention to provide a method of and an apparatus for processing a film to wind a film around a spool easily and reliably and speed up a winding process with a simple arrangement.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a perspective view, partly cut away, of the cam switching mechanism;

FIG. 29 is a timing chart showing a normal mode of operation;

FIG. 30A is a schematic view illustrative of the manner in which an elongate film is fed out;

FIG. 30B is a schematic view illustrative of the manner in which a film guide is opened;

FIG. 30C is a schematic view illustrative of the manner in which a leading end of the elongate film is inserted into a spool;

FIG. 30D is a schematic view illustrative of the manner in which the elongate film is cut off;

FIG. 31 is a timing short showing a short-film mode of operation;

DESCRIPTION OF THE PREFERRED EMBODIMENTS

Figure 1:
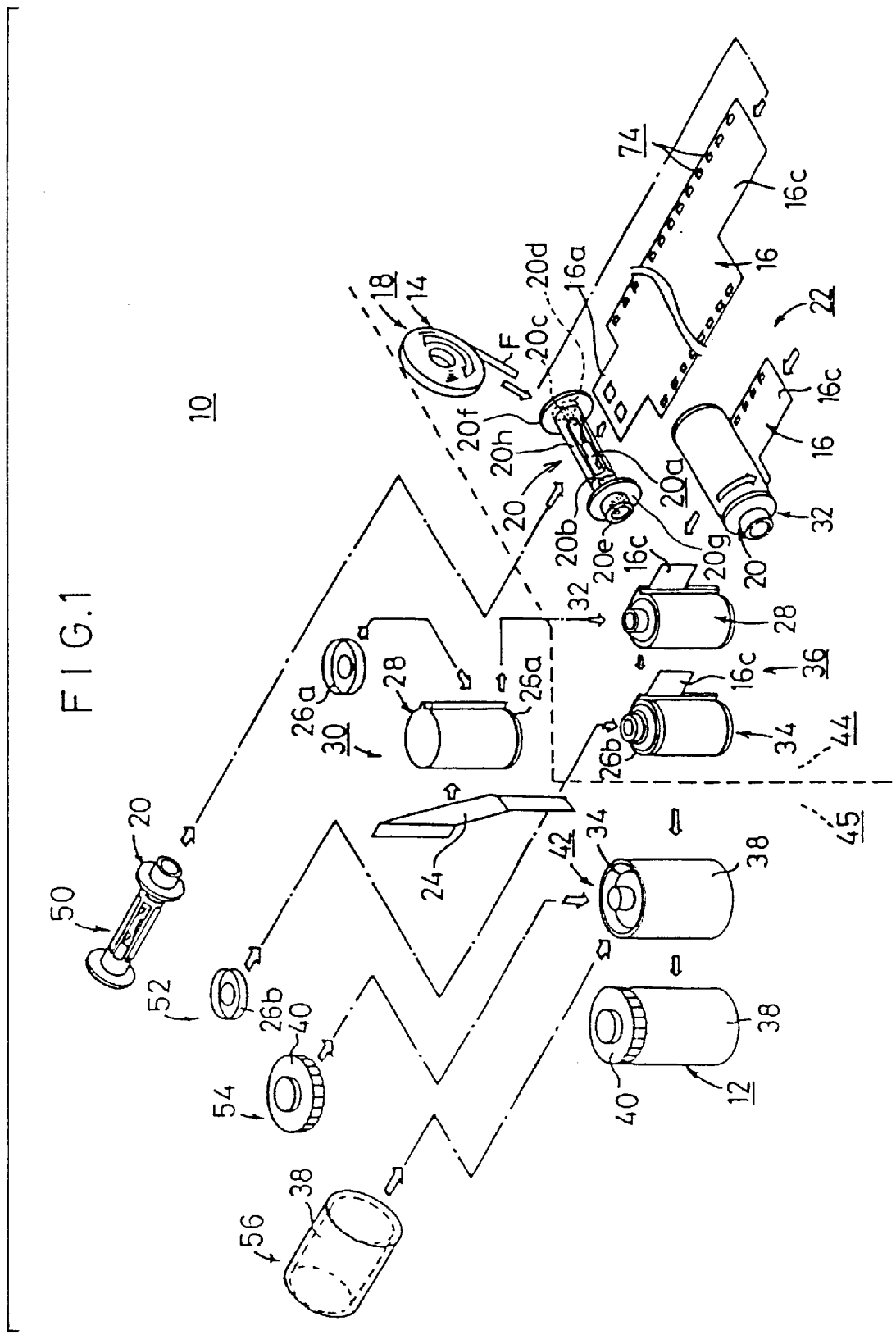
FIG. 1 is a schematic perspective view illustrative of the manner in which a packaged product is manufactured by a film producing and packaging system which carries out a method of processing a film according to a first embodiment of the present invention.

FIG. 1 illustrates in schematic perspective the manner in which a packaged product 12 is manufactured by a film producing and packaging system 10 which carries out a method of processing a film according to a first embodiment of the present invention. The film producing and packaging system 10 are shown in plan and side elevation in FIGS. 2 and 3, respectively.

Figure 2:
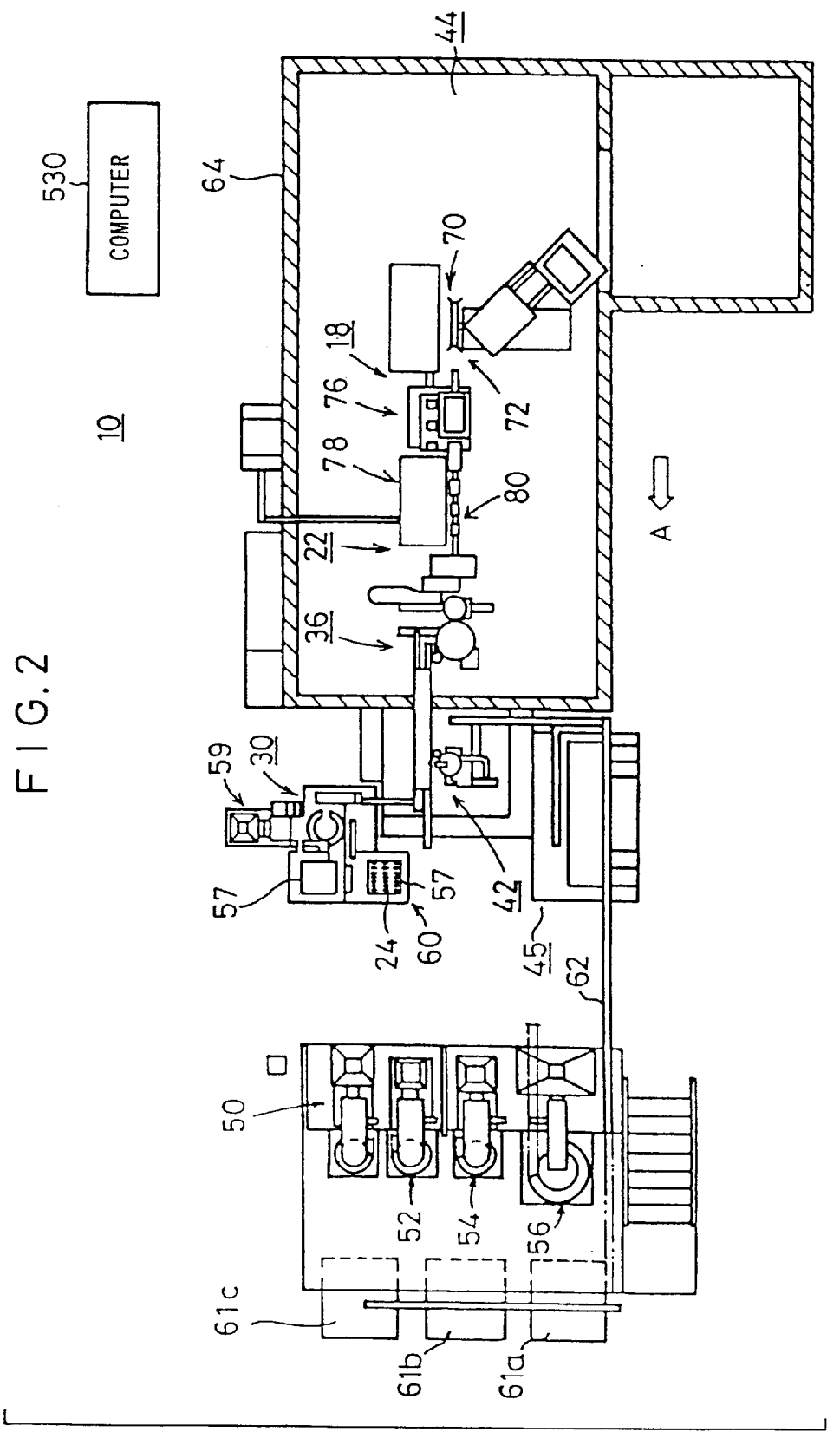
FIG. 2 is a schematic plan view of the film producing and packaging system.
Figure 3:
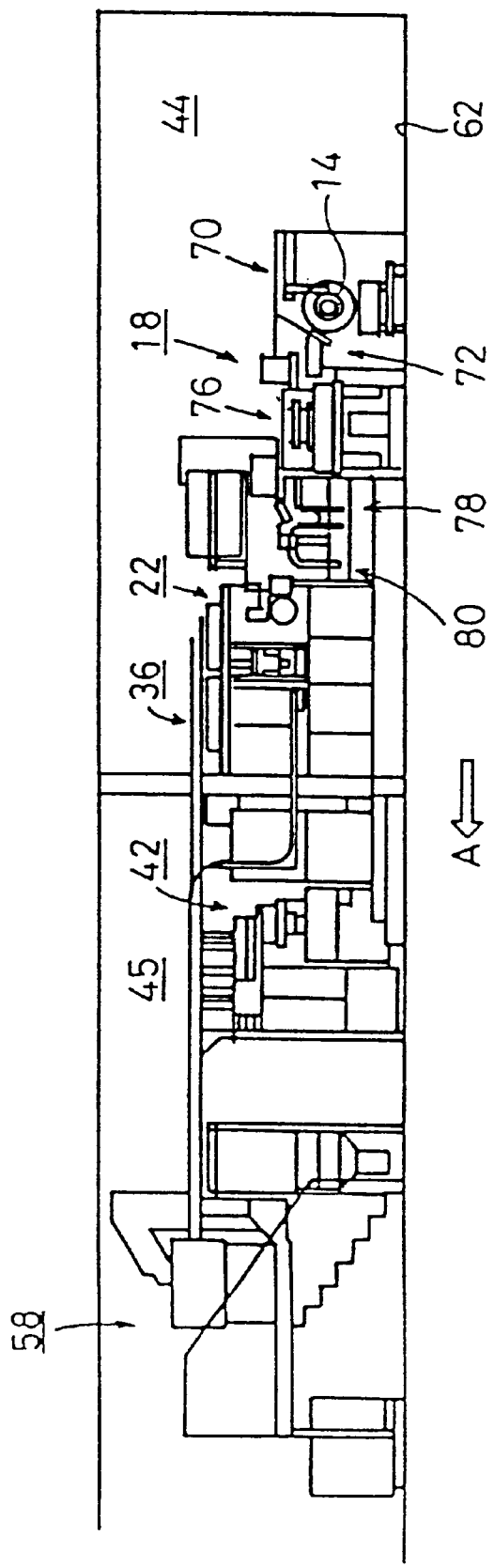
FIG. 3 is a schematic side elevational view of the film producing and packaging system.

As shown in FIGS. 1 through 3, the film producing and packaging system 10 generally comprises a film supply unit 18 for unwinding a film roll 14 of elongate photographic photosensitive film F (hereinafter referred to as elongate film F), cutting the unwound elongate film F into a film 16 of given length, and supplying the film 16, a film coiling unit (processing unit) 22 for positioning a spool 20 and the film 16 relatively to each other and winding the film 16 on the spool 20, a cartridge producing unit 30 for rounding a cartridge blank sheet 24 into a tubular form and staking a cap 26a on one end of the tubular form thereby to produce a cartridge 28 with one open end, an assembling unit 36 for inserting a film coil 32, which is made up of the film 16 wound on the spool 20, into the cartridge 28 through the open end thereof, and then staking another cap 26b on the open end of the cartridge 28 thereby to produce an assembled cartridge 34, and an encasing unit 42 for placing the assembled cartridge 34 into a case 38 and attaching a case cap 40 to an open end of the case 38 thereby to produce a packaged product 12.

The film supply unit 18, the film coiling unit 22, and the assembling unit 36 are housed in a dark room 44, and other devices, i.e., the encasing unit 42, etc. are housed in a bright room 45. The spool 20 has a groove 20a into which a film 16 of given length or an elongate film F is to be inserted, a step 20b for positioning the spool 20, a key 20c, a shorter boss (first boss) 20d on one end of the spool 20 near the key 20c, a longer boss (second boss) 20e on the other end of the spool 20, and a pair of flanges 20f, 20g, and a shank 20h.

Downstream of the film producing and packaging process, there are a spool supply unit 50 for supplying spools 20 to the film coiling unit 22, a cap supply unit 52 for supplying caps 26b to the assembling unit 36, a case cap supply unit 54 for supplying case caps 40 to the encasing unit 42, and a case supply unit 56 for supplying cases 38 to the encasing unit 42. The spool supply unit 50, the cap supply unit 52, the case cap supply unit 54, and the case supply unit 56 are positioned closely to each other.

As shown in FIG. 2, a cap supply unit 59 for supplying caps 26a and a cartridge blank sheet supply unit 60 for supplying cartridge blank sheets 24 on a pallet 57 are disposed near the cartridge producing unit 30. Packaged film product accumulating units 61a, 61b, 61c are disposed near the spool supply unit 50, the cap supply unit 52, the case cap supply unit 54, and the case supply unit 56. The packaged film product accumulating units 61a, 61b, 61c and the encasing unit 42 are coupled to each other by a conveyor 62.

Figure 4:
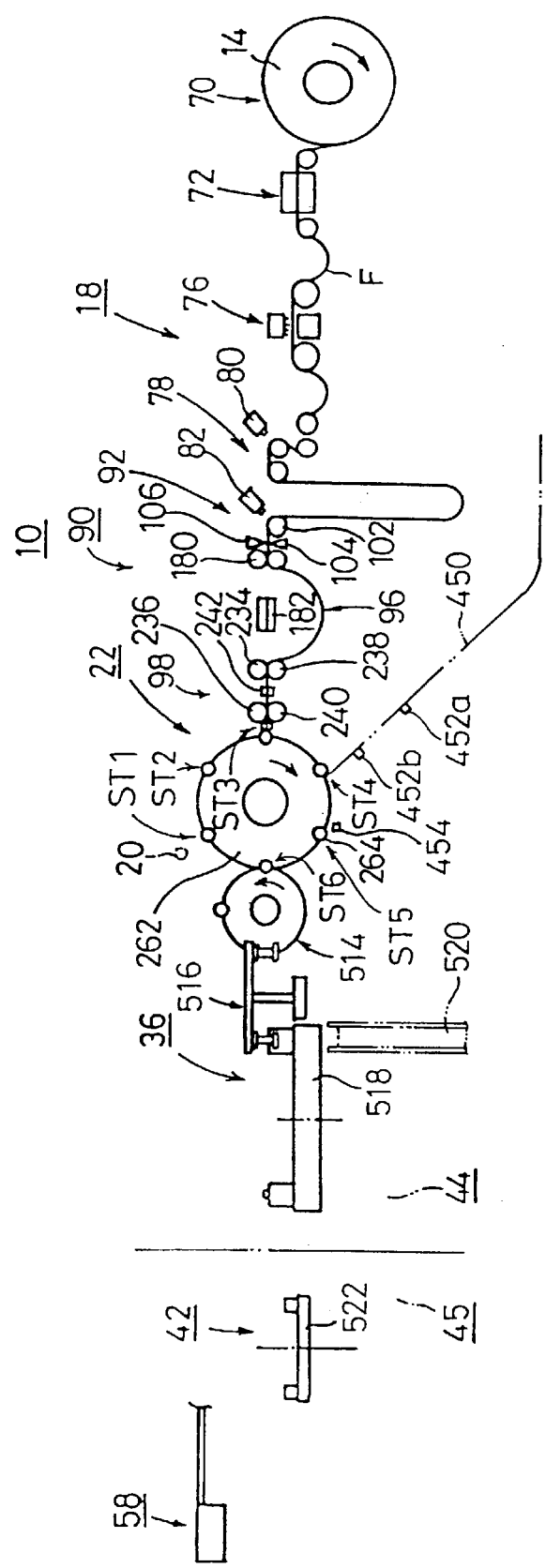
FIG. 4 is a schematic side elevational view of a succession of units ranging from a film supply unit to an assembling unit of the film producing and packaging system.

As shown in FIG. 4, the film supply unit 18 comprises a feeder 70 for holding a film roll 14 and unwinding the film roll 14, a splicer 72 for splicing a trailing end of the film roll 14 to a leading end of a new film roll 14, a perforator 76 for forming perforations 74 (see FIG. 1) in opposite longitudinal sides of an elongate film F unwound from the film roll 14, and a side printer 78 for printing latent image data on one or both of the sides of the elongate film F.

The side printer 78 comprises a first printing mechanism 80 and a second printing mechanism 82. The first printing mechanism 80 records a web-shaped print depending on the type of the film as a latent image on one or both sides of elongate films F, and the second printing mechanism 82 records a DX bar code, frame numbers, frame number bar codes, a commercial name, depending on the size of the film as latent images on one or both sides of elongate films F.

Figure 5:
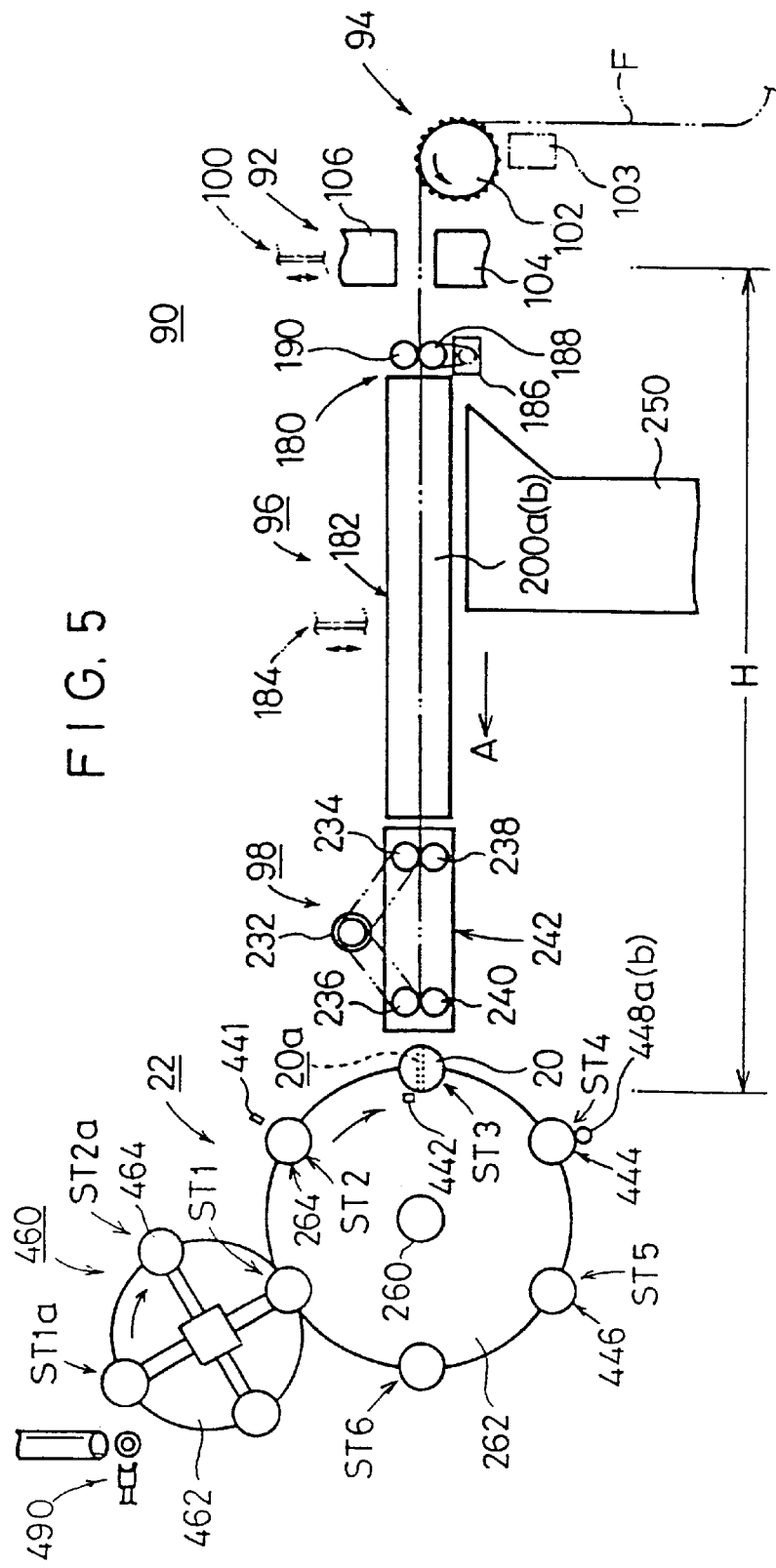
FIG. 5 is a schematic side elevational view of a cutting and inserting device for carrying out the method of processing a film.

A film cutting and inserting device (film processing device) 90 is disposed downstream of the side printer 78. As shown in FIGS. 4 and 5, the film cutting and inserting device 90 comprises a cutting mechanism 92 for cutting off the elongate film F into a sized film 16 of given length, a first feed mechanism 94 for feeding the elongate film F a distance equal to the given length toward the cutting mechanism 92, a second feed mechanism 96 disposed downstream of the cutting mechanism 92, for feeding the trailing end 16c of the sized film 16 toward a spool 20 disposed in an inserting position in the film coiling unit 22, an inserting mechanism 98 disposed near the spool 20, for inserting the leading end of the elongate film F (or the sized film 16 ) into the spool 20, and a cam switching mechanism 100 for changing the timing of operation of the cutting mechanism 92 depending on the given length.

The first feed mechanism 94 has a sprocket 102 whose teeth can be inserted into the perforations defined in the both sides of the elongate film F. for feeding the elongate film F a constant length in the direction indicated by the arrow A. The sprocket 102 can be rotated about its own axis counterclockwise in the direction indicated by the arrow in FIG. 5 by a servomotor (rotary actuator) 103.

Figure 6:
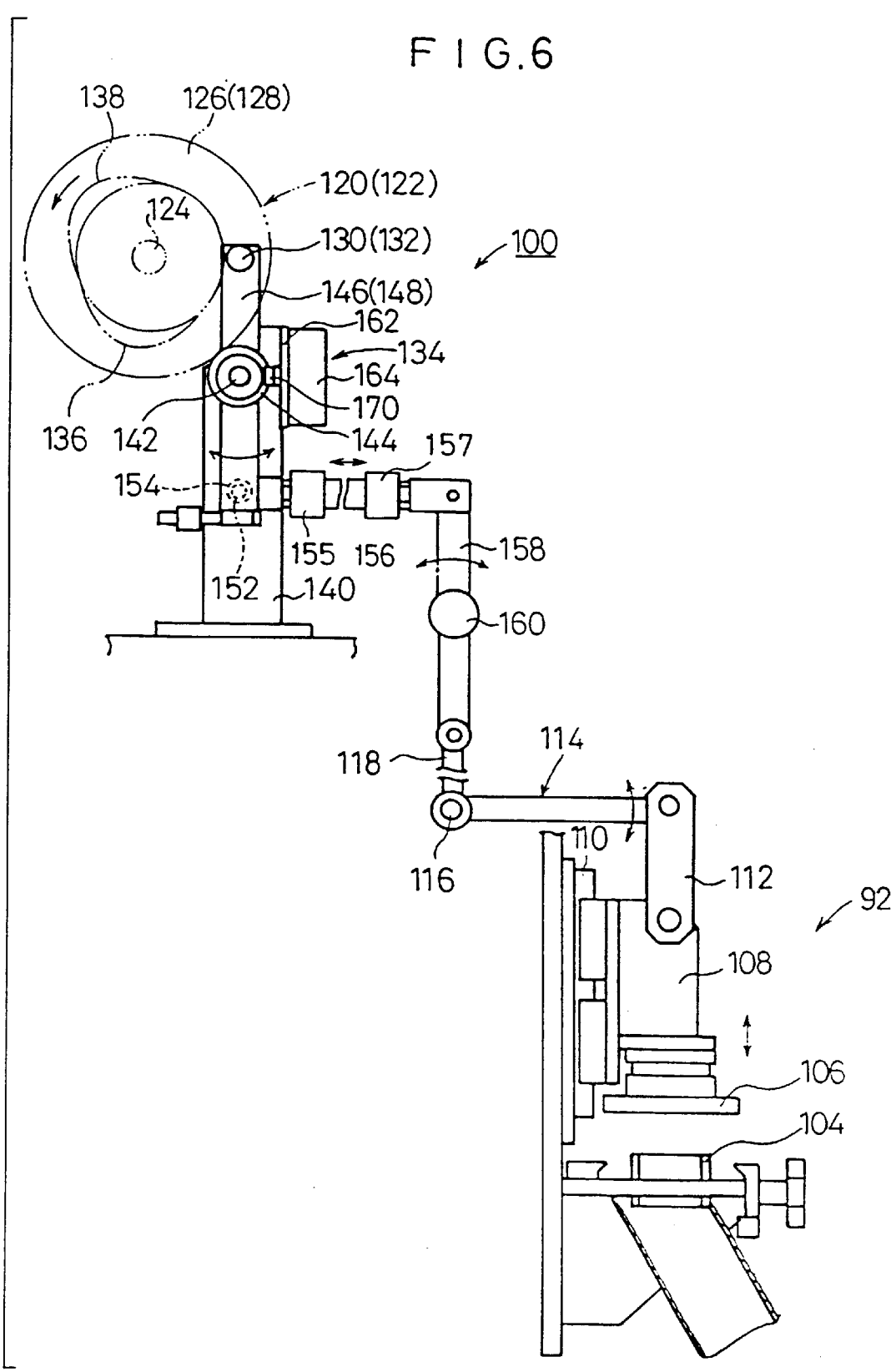
FIG. 6 is a front elevational view of a cutting mechanism and a cam switching mechanism of the film cutting and inserting device.

As shown in FIGS. 4 through 6, the cutting mechanism 92 comprises a fixed blade 104 and a movable blade 106 which are disposed in vertically spaced and confronting relationship to each other. As shown in FIG. 6, the movable blade 106 is fixed to a lower end of a vertically movable base 108 that is vertically movably supported on a vertically extending rail 110. The vertically movable base 108 has an upper end to which there is pivoted an end of a short link 112 whose other end is pivotally coupled to an end of a long link 114. The other end of the long link 114 integrally coupled to a joint 118 that is angularly movably supported by a pivot 116. The cam switching mechanism 100 is operatively connected to the joint 118.

Figure 8A:
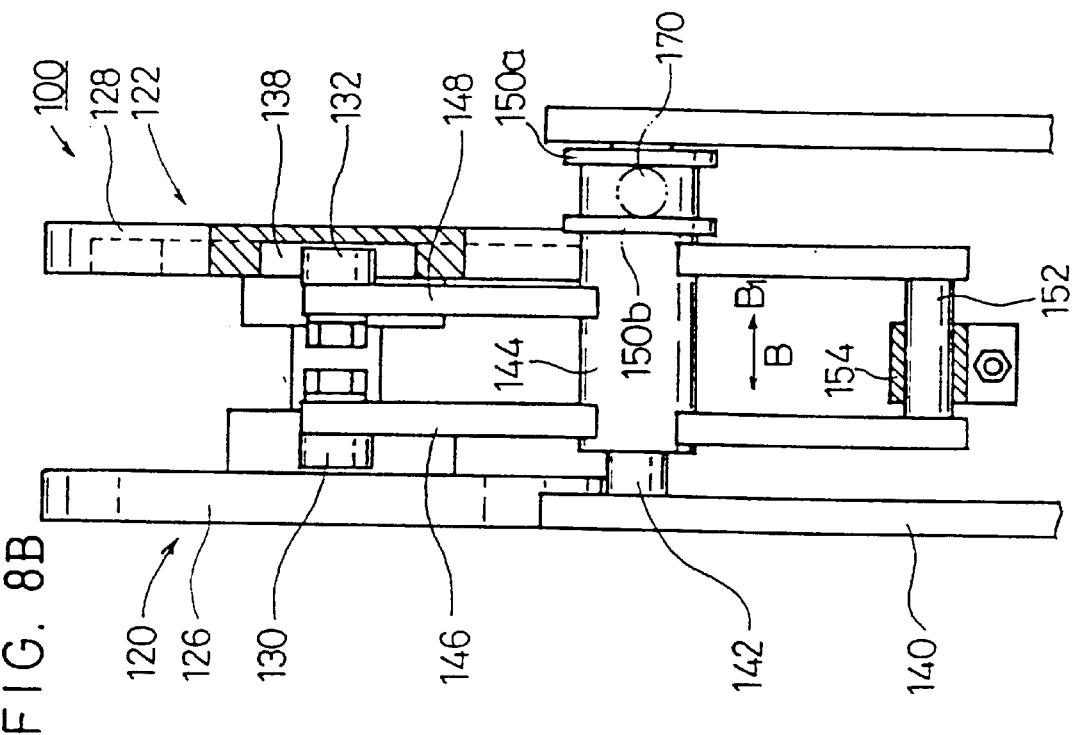
FIG. 8A is a side elevational view of the cam switching mechanism, showing a first cam assembly in an operable state.
Figure 8B:
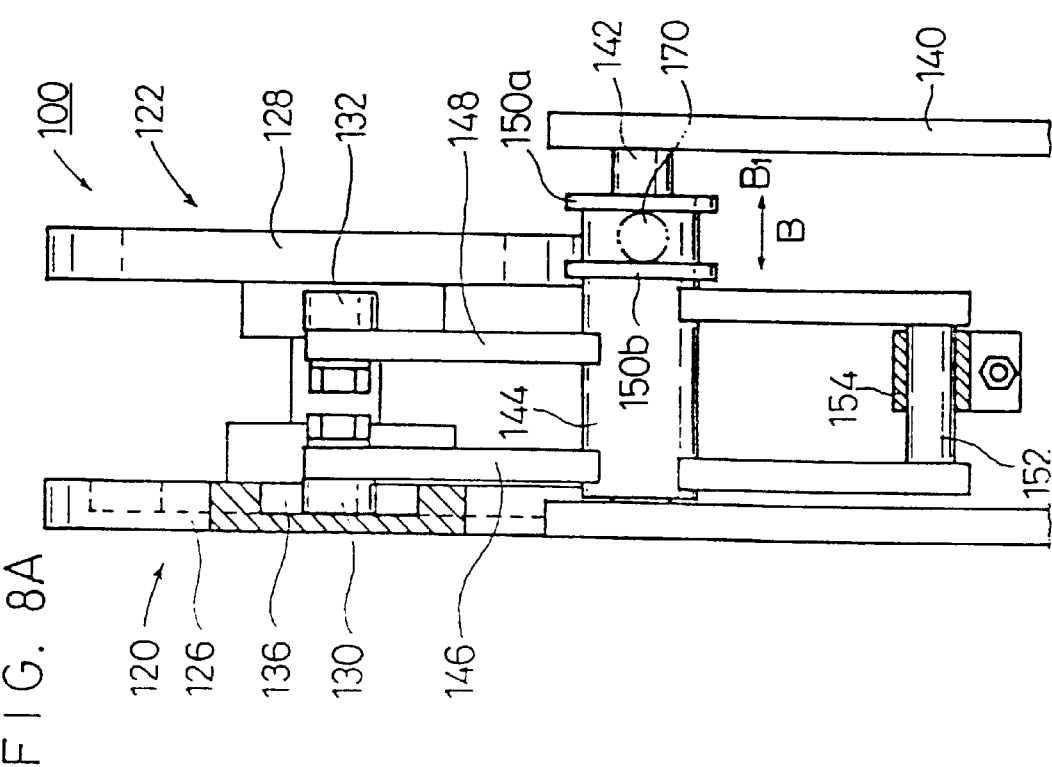
FIG. 8B is a side elevational view of the cam switching mechanism, showing a second cam assembly in an operable state.

The cam switching mechanism 100 comprises first and second cam assemblies 120, 122 selectively connected to the cutting mechanism 92, for changing the timing of operation of the cutting mechanism 92. As shown in FIGS. 7, 8A, and 8B, the first and second cam assemblies 120, 122 have respective first and second cams 126, 128 juxtaposed on a drive shaft 124 for rotation in unison with each other, respective first and second cam followers 130, 132 engageable with the first and second cams 126, 128, respectively, and a switching unit 134 for selectively bringing the first and second cam followers 130, 132 into engagement with the first and second cams 126, 128, respectively.

The first cam 126 has a first cam profile surface 136 for sliding contact with the first cam follower 130, and the second cam 128 has a second cam profile surface 138 for sliding contact with the second cam follower 132. The first and second cam profile surfaces 136, 138 have such a profile that they can actuate the movable blade 106 of the cutting mechanism 92 at respective angular positions. The timing of operation of the movable blade 106 with the first and second cam assemblies 120, 122 will be described later on.

The cam switching mechanism 100 includes a base 140 on which a horizontal rod 142 is mounted in upwardly spaced relation thereto. A movable tube 144 is axially movably fitted over the rod 142 for movement in the directions indicated by the arrow B. First and second swing plates 146, 148 are fixedly mounted on the outer circumferential surface of the movable tube 144 and extend radially across the movable tube 144 in parallel spaced relation to each other. A pair of axially spaced flanges 150a, 150b is mounted on the movable tube 144 near one end thereof on one side of the first and second swing plates 146, 148.

The first and second cam followers 130, 132 are mounted on respective ends of the first and second swing plates 146, 148, and a support shaft 152 is fixed to the other ends of the first and second swing plates 146, 148. The support shaft 152 is supported for movement in the horizontal direction by a predetermined distance with respect to a tube 154. As shown in FIG. 6, a first cylinder 155 is attached to the tube 154, and a second cylinder (actuating means) 157 engages the first cylinder 155 through a connecting rod 156. To the second cylinder 157, there is coupled an end of a swing link 158 that is angularly movable about a central shaft 160. The swing link 158 has a lower end coupled to the joint 118 of the long link 114.

As shown in FIGS. 6 and 7, the switching unit 134 has a cylinder 164 mounted on a pair of attachment plates 162 parallel to the movable tube 144. The cylinder 164 has a piston rod (not shown) projecting therefrom on which a roller cam 170 is mounted by an arm 168. The roller cam 170 is positioned between the flanges 150a, 150b on the movable tube 144.

As shown in FIG. 5, the second feed mechanism 96 comprises a nip roller pair 180 for gripping and feeding an elongate film F and a sized film 16, an openable and closable film guide 182 disposed between the nip roller pair 180 and the inserting mechanism 98, and a cam switching unit 184 for changing the timing of operation of the film guide 182 depending on the length of a sized film 16 which has been cut off. The nip roller pair 180 comprises a drive roller 188 rotatable by a servomotor 186 and a driven roller 190 held in rolling contact with the drive roller 188.

Figure 9:
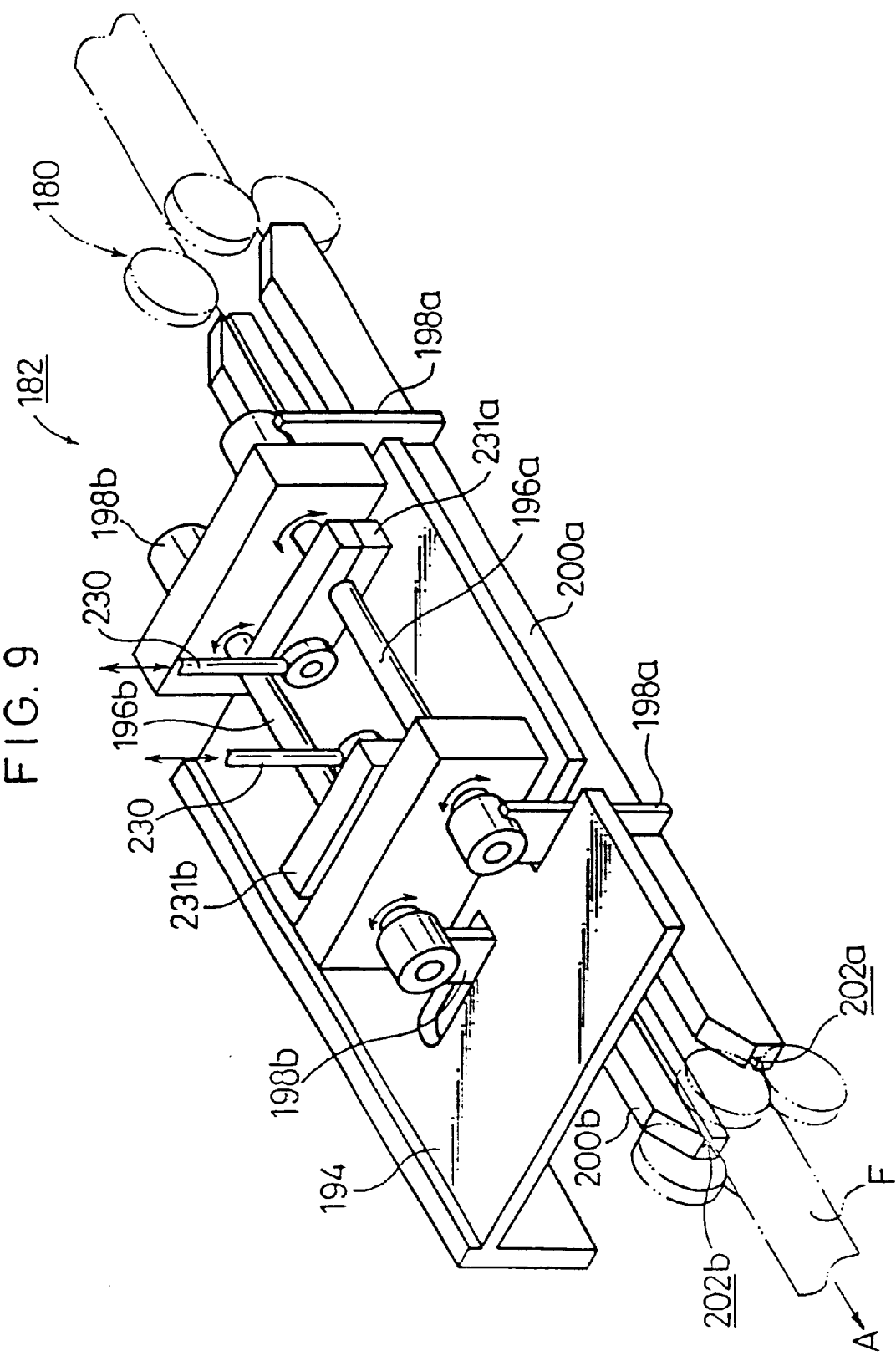
FIG. 9 is a perspective view of a second feed mechanism of the film cutting and inserting device.
Figure 10:
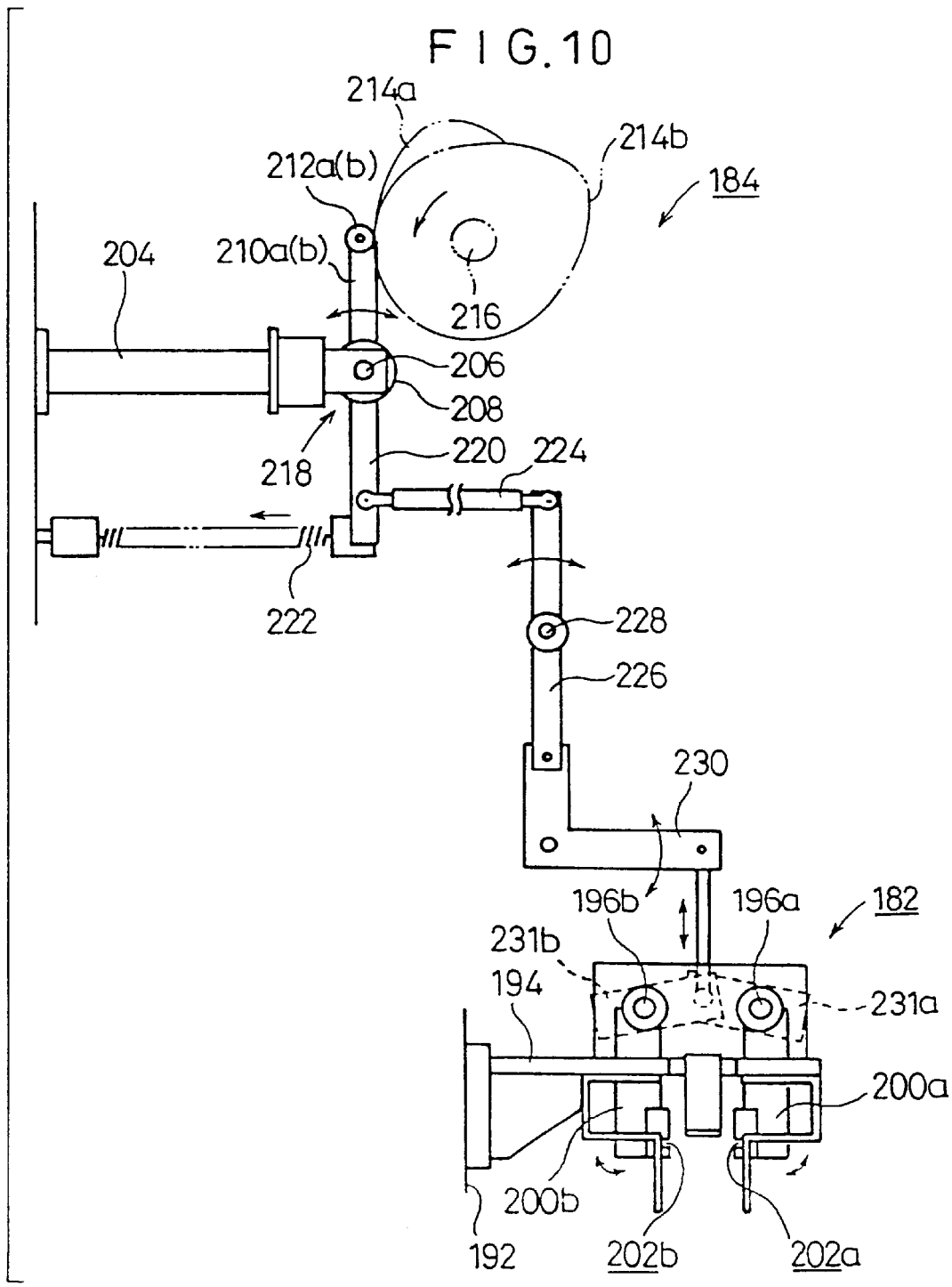
FIG. 10 is a front elevational view of a cam switching assembly of the second feed mechanism.

As shown in FIGS. 9 and 10, the film guide 182 has a horizontal support plate 194 fixed to a frame 192 and a pair of parallel rotatable shafts 196a, 196b disposed on the support plate 194. Pairs of joint bars 198a, 198b are fixed at upper ends thereof to axially opposite ends of the rotatable shafts 196a, 196b and at lower ends thereof to guide members 200a, 200b. The guide members 200a, 200b are elongate in the direction indicated by the arrow A, and have respective guide grooves 202a, 202b defined in respective facing sides thereof.

As shown in FIG. 10, the cam switching unit 184 has a fixed bracket 204 which supports a rod 206 on its distal end. A movable tube 208 is fitted over the rod 206 for axial movement thereon, and first and second swing plate 210a, 210b which are axially spaced from each other are mounted on the movable tube 208 and extend upwardly therefrom. First and second cam followers 212a, 212b are supported on respective upper ends of the first and second swing plate 210a, 210b. The first and second cam followers 212a, 212b can selectively engage first and second cams 214a, 214b, respectively, which are fixedly mounted on a drive shaft 216 for rotation therewith.

A switching unit 218 is combined with the movable tube 208. The switching unit 218 is identical in structure to the switching unit 134, and will not be described in detail below.

A swing lever 220 is mounted on and extends downwardly from the movable tube 208. The swing lever 220 has a lower end engaged by a tension spring 222 disposed below the fixed bracket 204. A joint rod 224 has an end pivotally coupled to the swing lever 220 and an opposite end pivotally coupled to an upper end of a swing link 226 that is angularly movable about a central shaft 228. The swing link 226 has a lower end coupled to links 230 which are pivoted to respective joints 231a, 231b secured to the respective rotatable shafts 196a, 196b.

Figure 11:
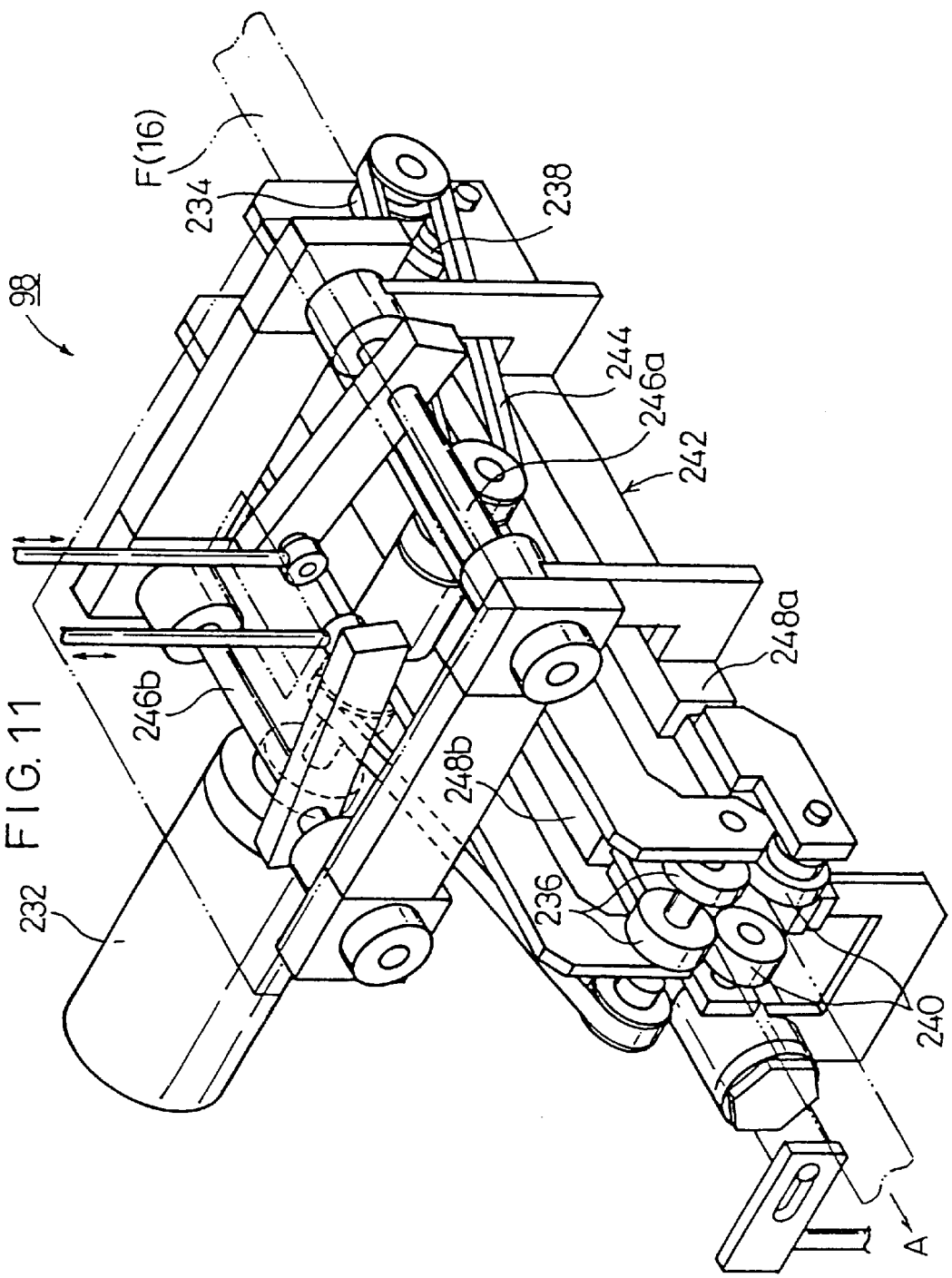
FIG. 11 is a perspective view of an inserting mechanism of the film cutting and inserting device.
Figure 12:
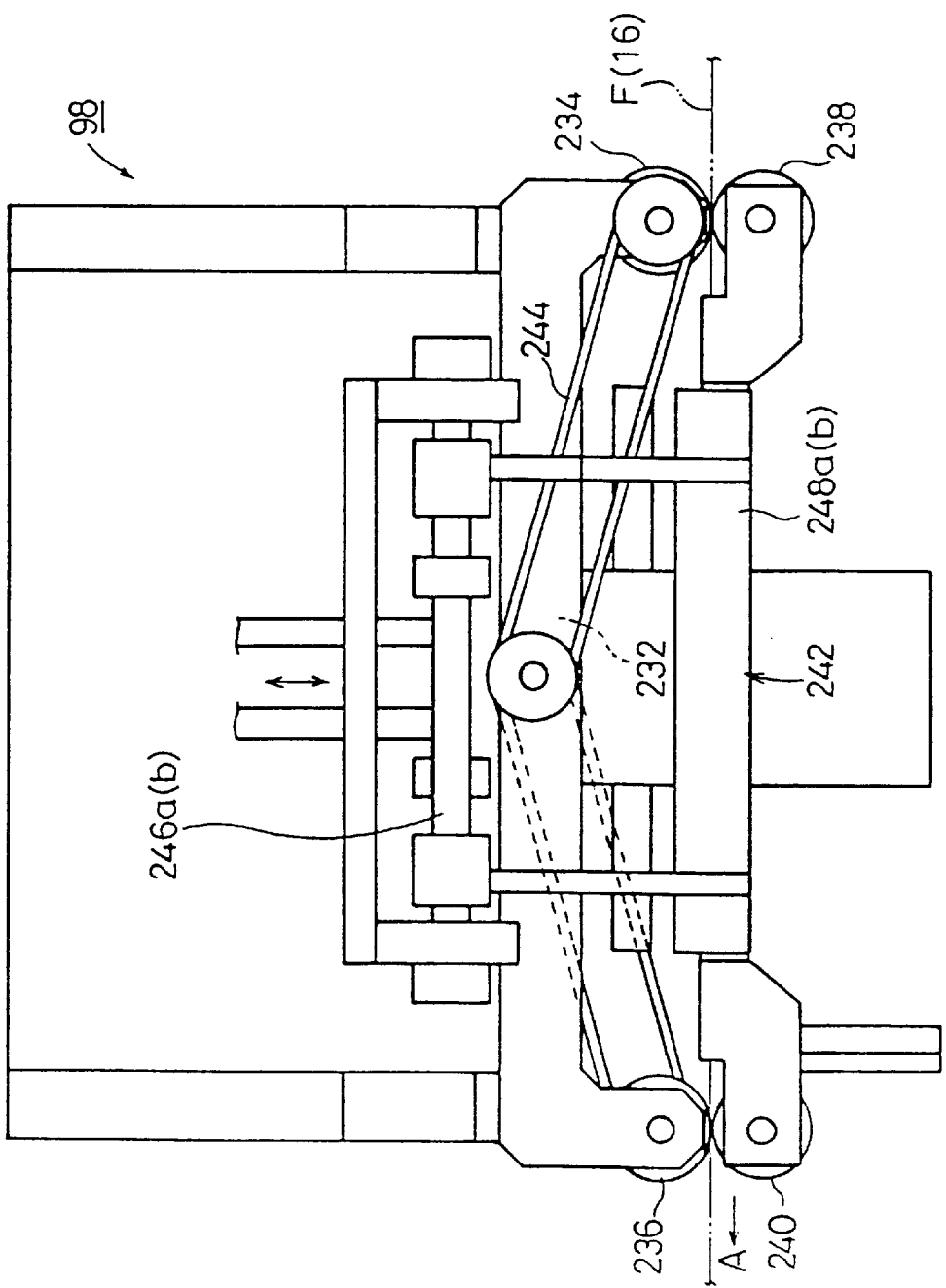
FIG. 12 is a side elevational view of the inserting mechanism.
Figure 13:
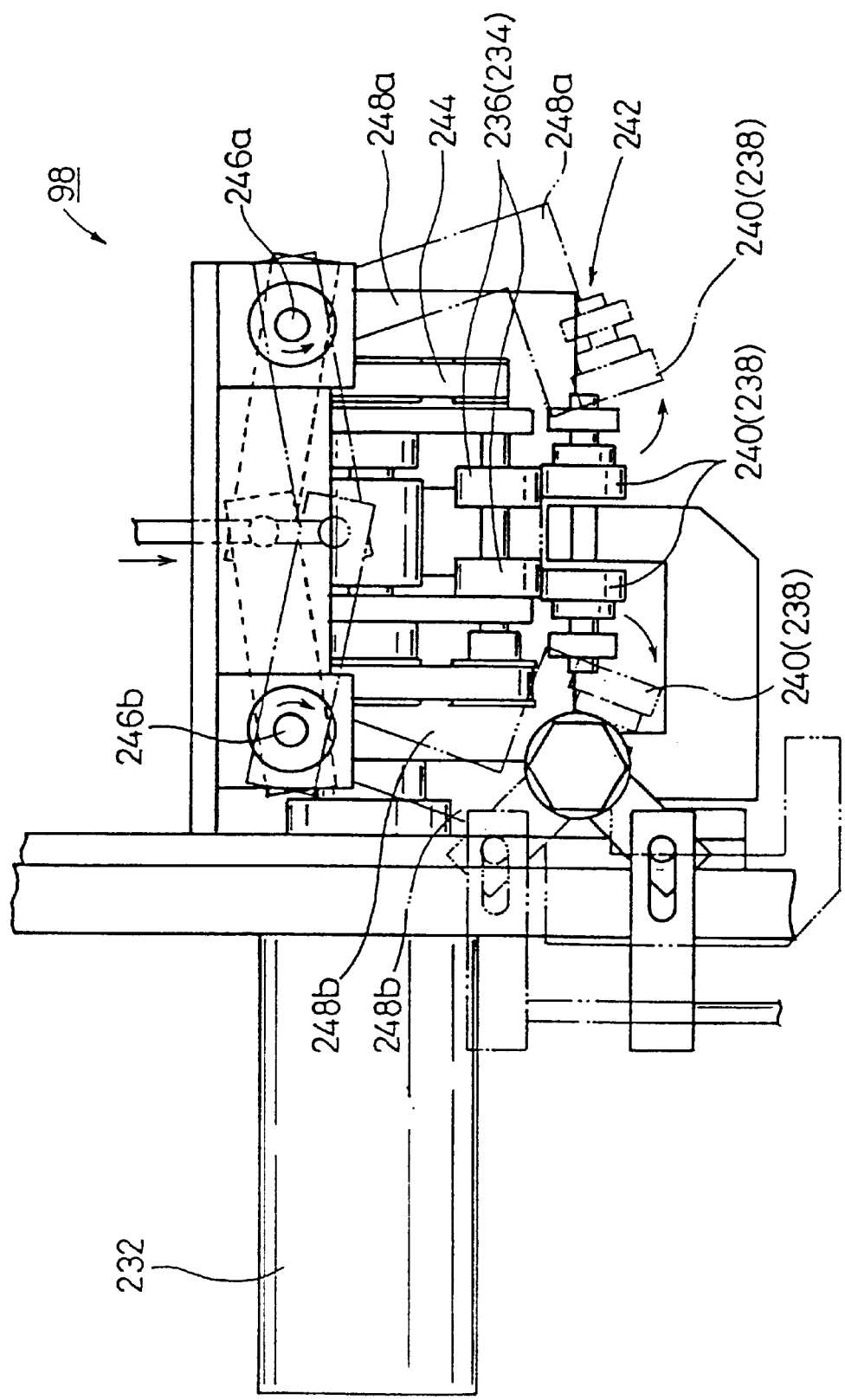
FIG. 13 is a front elevational view of the inserting mechanism.

As shown in FIGS. 11 through 13, the inserting mechanism 98 comprises a pair of first and second inserting rollers 234, 236 rotatable in synchronism with each other by an insertion motor 232 such as a servomotor or the like (rotary actuator), a pair of first and second pinch rollers 238, 240, each split into two roller segments, rollingly engageable with the first and second inserting rollers 234, 236, respectively, and an openable and closable insertion guide 242.

The first and second inserting rollers 234, 236 can be rotated by the insertion motor 232 through a belt and pulley mechanism 244 operatively coupled to the insertion motor 232. The insertion guide 242 comprises a pair of guide plates 248a, 248b swingable about respective support shafts 246a, 246b. The first and second pinch rollers 238, 240 are rotatably supported on the guide plates 248a, 248b, respectively.

Figure 14:
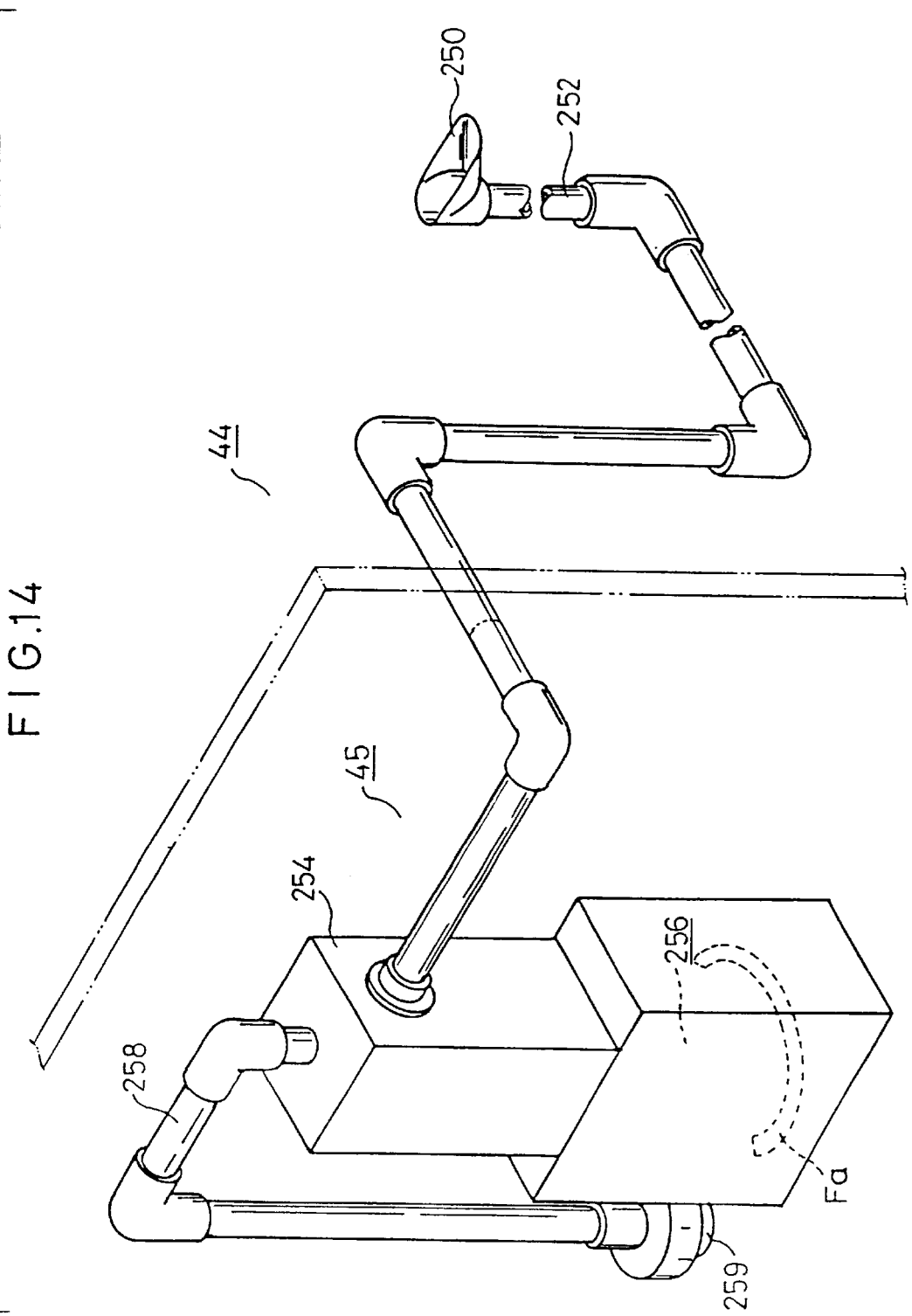
FIG. 14 is a perspective view of a defective film discharging structure.

As shown in FIG. 5, a discharge port 250 for automatically discharging defective films Fa is positioned below the film guide 182 for movement in a direction normal to the sheet of FIG. 5. As shown in FIG. 14, a discharge chute 252 has an end connected to the discharge port 250. The discharge chute 252 extends from the dark room 44 into the bright room 45 where it communicates with an accumulation chamber 256 within a discharge box 254. To an upper portion of the discharge box 254, there is connected an end of a pipe 258 which extends vertically downwardly and is connected to an air blower 259.

As shown in FIG. 5, the film coiling unit 22 has a first turntable 262 fixed to a main shaft 260 intermittently rotatable clockwise in the direction indicated by the arrow. Six spool chuck mechanisms 264, for example, are mounted at equal angular intervals on the first turntable 262. The first turntable 262 has thereon a spool supply station ST1, a spool positioning inspecting station ST2, an inserting station ST3, a prewinding station ST4, a winding station ST5, and a transfer station ST6 which are successively angularly positioned clockwise (in the direction indicated by the arrow) in the order named.

Figure 16:
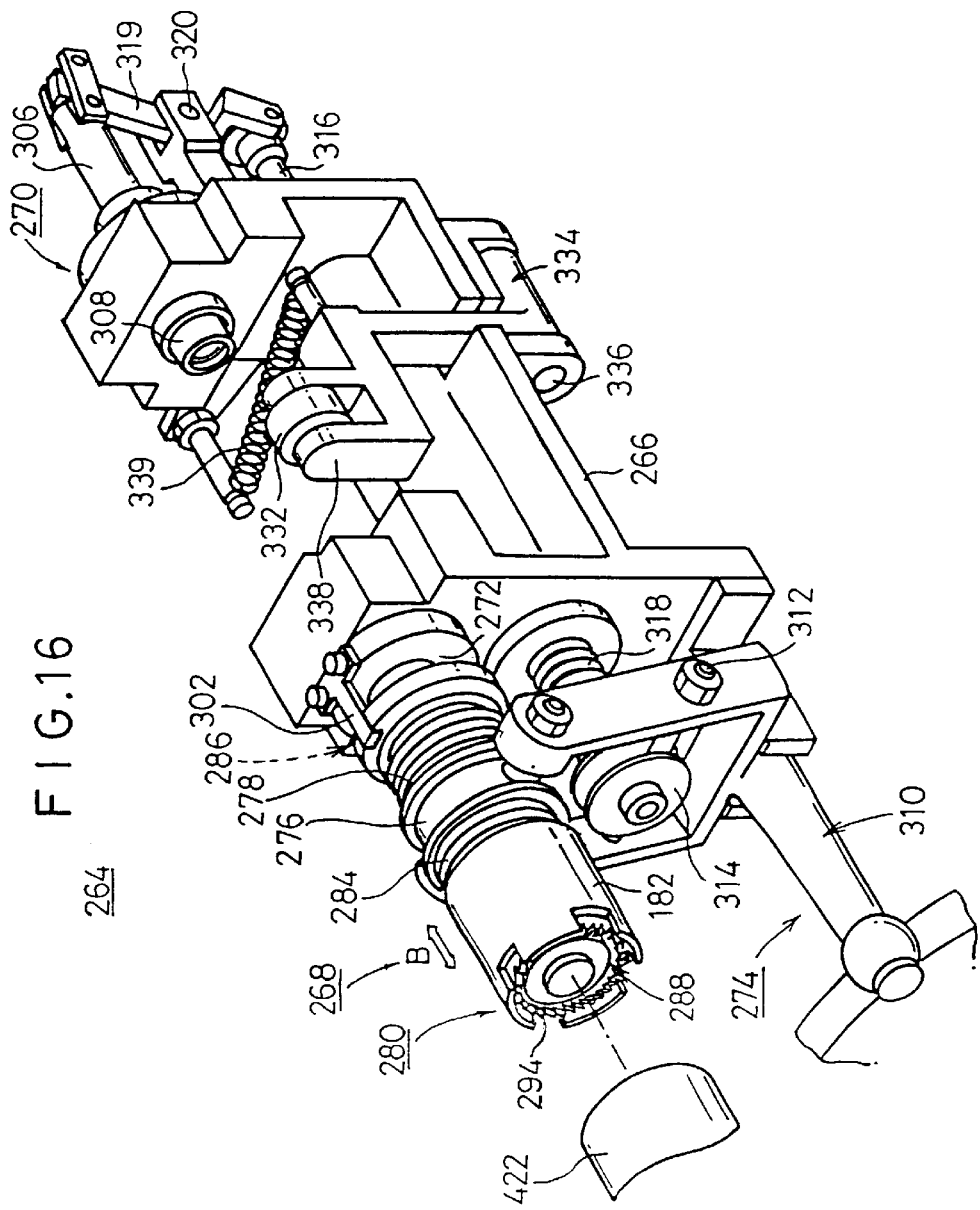
FIG. 16 is a perspective view of the spool chuck mechanism in its entirety.
Figure 17:
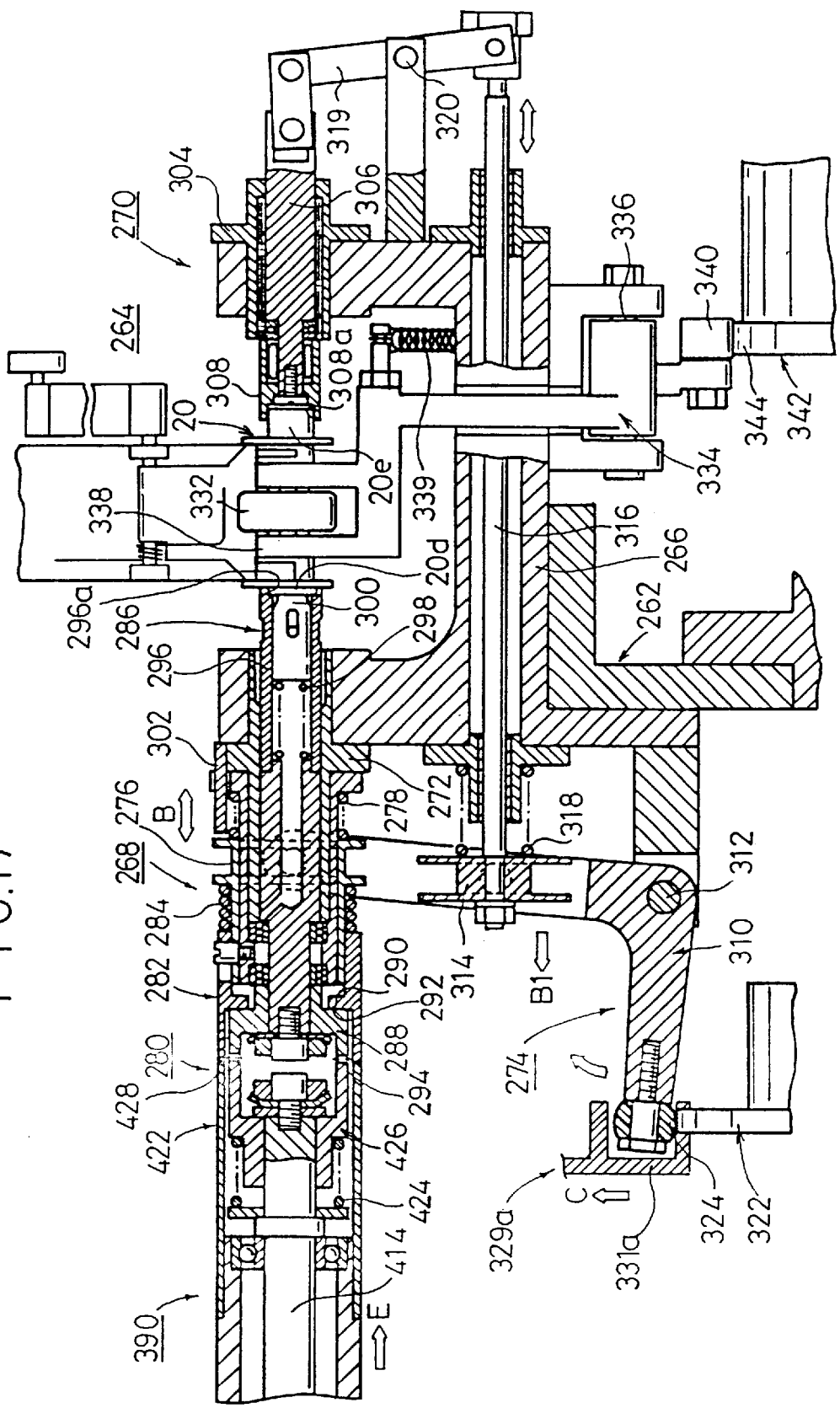
FIG. 17 is a vertical cross-sectional view of the spool chuck mechanism.
Figure 18:
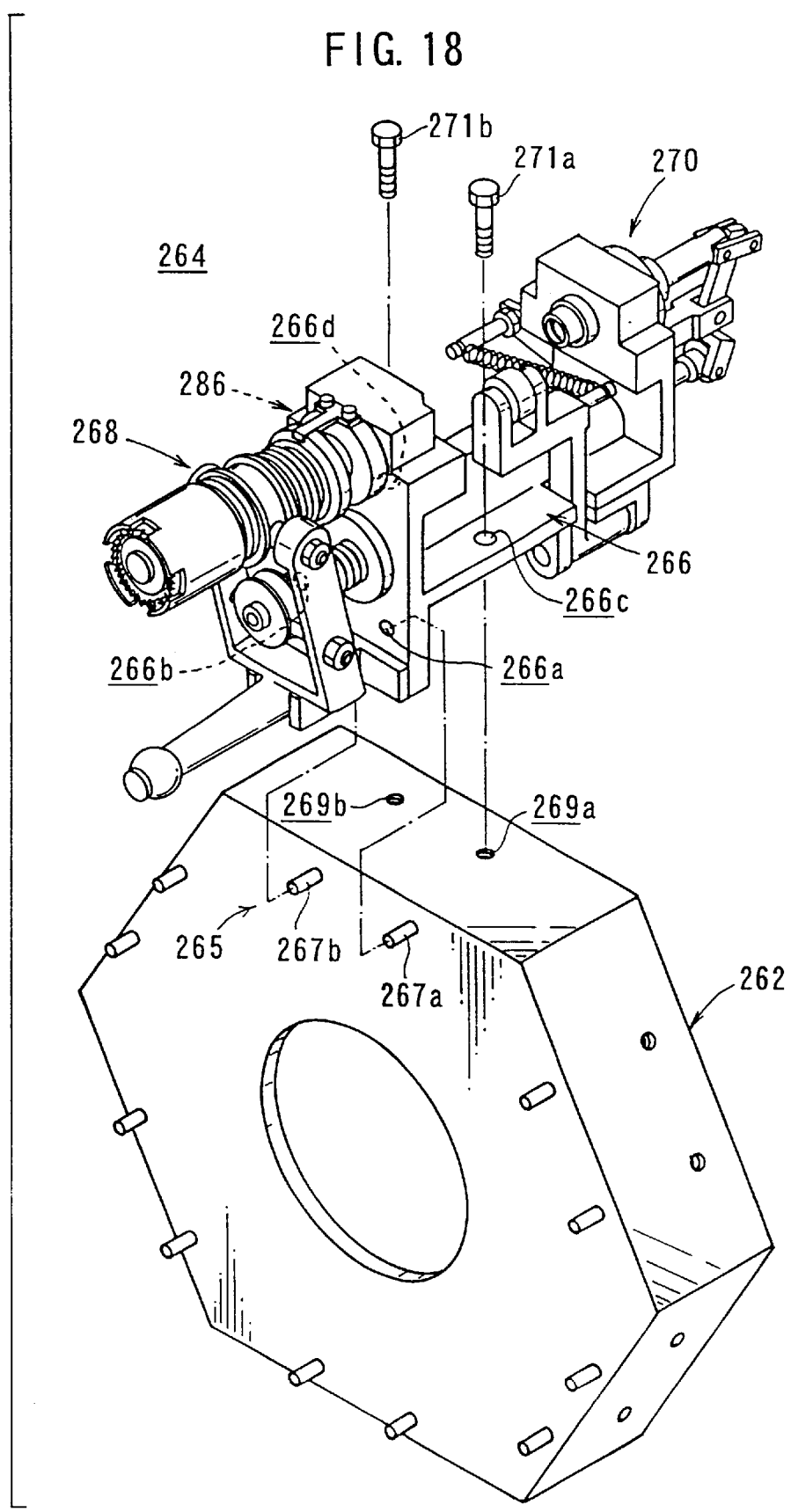
FIG. 18 is a perspective view of the spool chuck mechanism and the first turntable.

As shown in FIGS. 15 through 18, each of the spool chuck mechanisms 264 is of a unitized construction, and removably mounted on an outer circumferential facet of the first turntable 262 by a positioning assembly 265. As shown in FIG. 18, the positioning assembly 265 comprises six sets of positioning pins 267a, 267b mounted on sides of the first turntable 262, and engaging holes 266a, 266b defined in ends of support blocks 266 of the spool chuck mechanisms 264.

Each of the support blocks 266 of the spool chuck mechanisms 264 has attachment holes 266c, 266d defined therein, and the first turntable 262 has threaded holes 269a, 269b defined in the outer circumferential facets thereof. Screws 271a, 271b are threaded through the attachment holes 266c, 266d into the threaded holes 269a, 269b, fastening the spool chuck mechanisms 264 to the respective outer circumferential facets of the first turntable 262.

As shown in FIGS. 16 and 17, the support block 266 supports on one end thereof a first support assembly 268 for engaging one end of a spool 20 and rotatably supporting the spool 20, and also supports on the other end thereof a second support assembly 270 for rotatably supporting the other end of the spool 20. The first support assembly 268 has a fixed sleeve 272 fixed to the support block 266, and a movable sleeve 276 which is movable back and forth in the directions indicated by the arrow B by a cam mechanism 274 is disposed around the fixed sleeve 272. A spring 278 is interposed between the movable sleeve 276 and the fixed sleeve 272. A mechanical clutch 280 has a clutch sleeve 282 fitted around the movable sleeve 276, with a spring 284 interposed between the clutch sleeve 282 and the movable sleeve 276.

The clutch sleeve 282 has a clutch surface 292 which can be brought into and out of contact with a clutch surface 290 of a clutch member 288 integrally coupled to a holder shaft 286 rotatably disposed in the fixed sleeve 272. The holder shaft 286 can be rotated and stopped when the clutch surfaces 290, 292 engage and disengage from each other (see FIG. 17). The clutch member 288 has a gear 294 on an end thereof remote from the clutch surface 290. The holder shaft 286 has a cylindrical body 296 for engaging an end of the spool 20 and a rotatable pin 300 axially movably positioned in the cylindrical body 296 under the bias of a spring 298. The cylindrical body 296 has a stepped inner circumferential surface 296a on an end thereof for engaging an end surface and outer circumferential surface of the shorter boss 20d of the spool 20. The stepped inner circumferential surface 296a is of a tapered shape spreading outwardly toward the spool 20 for guiding the shorter boss 20d. The first support assembly 268 has a self-locking mechanism 302 for preventing the spool 20 from rotating undesirably.

Figure 19:
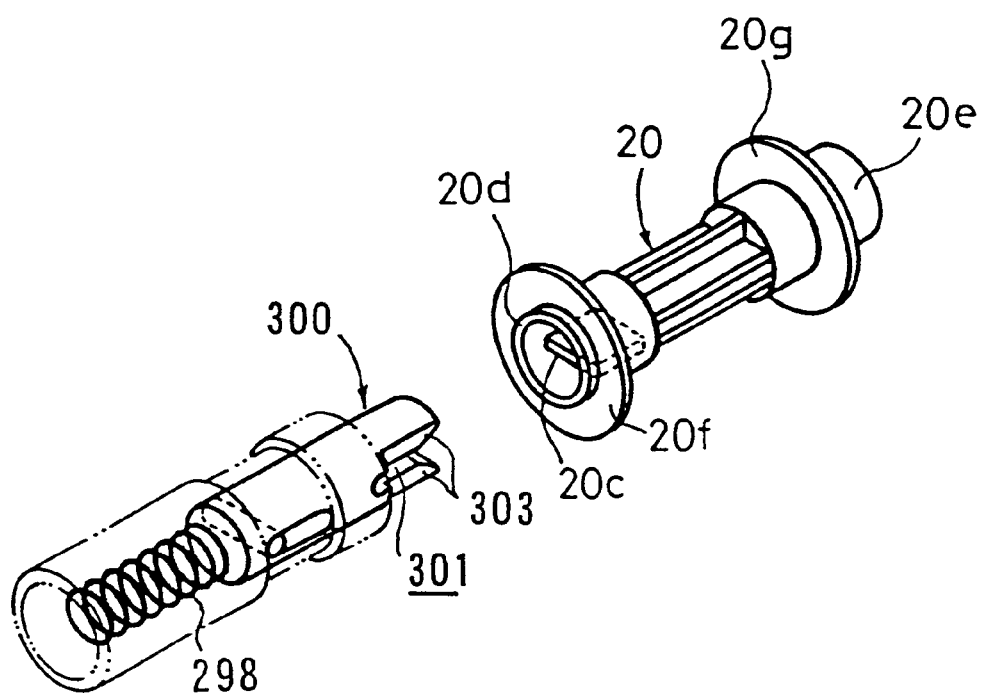
FIG. 19 is a perspective view of a rotatable pin and a spool of the spool chuck mechanism.

As shown in FIG. 19, the rotatable pin 300 has a groove 301 for receiving the key 20c in an end of the spool 20. The groove 301 has an opening having a dimension that differs from the thickness of the key 20c by a range from +0.7 mm to +0.9 mm. The groove 301 includes outwardly spreading tapered ends 303 for guiding the key 20c. The rotatable pin 300 is axially movable under the resiliency of the spring 298 for preventing the spool 20 and a spool rotating mechanism 392 (described later on) from being damaged. The spring 298 has a spring force that is maintained in a range from 250 gf to 450 gf.

As shown in FIG. 17, the second support assembly 270 has a fixed sleeve 304 fixed to the support block 266 and an axially movable slide pin 306 disposed in the fixed sleeve 304. The slide pin 306 supports a rotatable sleeve 308 mounted on a distal end thereof. The rotatable sleeve 308 has a stepped inner circumferential surface 308a on an end thereof for engaging an end surface and outer circumferential surface of the longer boss 20e of the spool 20. The stepped inner circumferential surface 308a is of a tapered shape spreading outwardly toward the spool 20 for guiding the longer boss 20e. When the shorter and longer bosses 20d, 20e on the opposite ends of the spool 20 are held respectively by the inner circumferential surfaces 296a, 308a, the spool 20 is centered in position within an accuracy of 0.05 mm with respect to the diameter of the shorter and longer bosses 20d, 20e.

The cam mechanism 274 has a swing arm 310 angularly movably mounted on the support block 266 by a support shaft 312. The swing arm 310 has a longer arm portion whose end is engaged by the movable sleeve 276, and is engaged by a bobbin-shaped cam 314 between the movable sleeve 276 and the support shaft 312. The bobbin-shaped cam 314 is fixed to an end of a rod 316 and is normally urged to move axially in the direction indicated by the arrow B by a spring 318 acting on the bobbin-shaped cam 314 (see FIG. 17). The rod 316 has an opposite end engaged by an end of a link 319 which is pivotally supported at its substantially central region by a support shaft 320. The slide pin 306 is coupled to the opposite end of the link 319.

Figure 20:
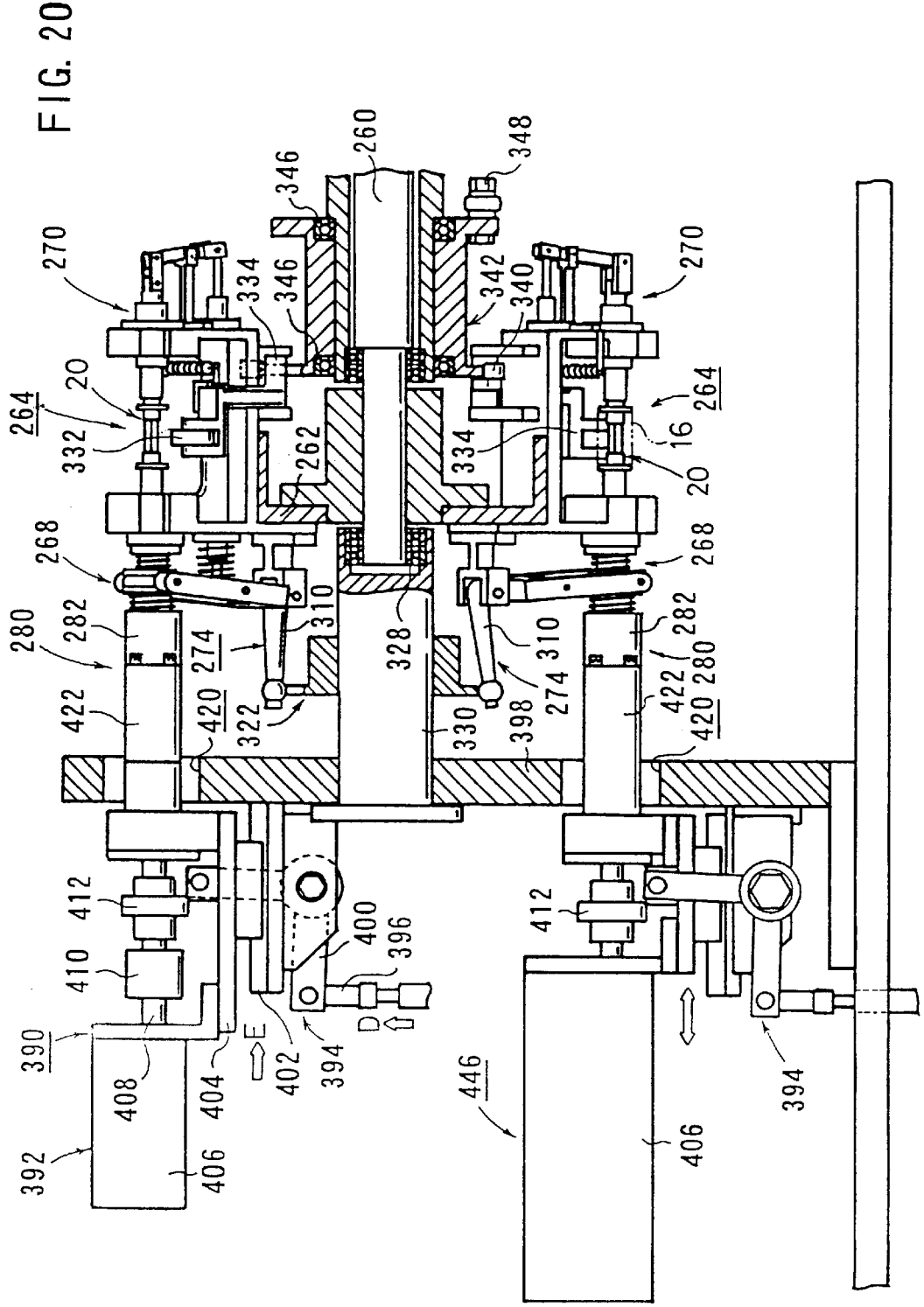
FIG. 20 is a side elevational view, partly cut away, of a film coiling unit.

The swing arm 310 has a shorter arm portion whose end is held in sliding contact with a cam surface 324 of a first cam member 322. As shown in FIG. 20, the first cam member 322 is fixed to a column 330 on which the distal end of the main shaft 260 is rotatably supported by a bearing 328. The cam surface 324 of the first cam member 322 serves to move the first and second support assemblies 268, 270 through the swing arm 310 (see FIG. 21).

Specifically, the cam surface 324 has a cam profile shaped such that while a spool chuck mechanism 264 is moving from the transfer station ST6 to the spool supply station ST1 upon rotation of the first turntable 262, the spool chuck mechanism 264 releases a spool 20, and while a spool chuck mechanism 264 is moving from the spool supply station ST1 to the transfer station ST6, the spool chuck mechanism 264 grips a spool 20.

Figure 21:
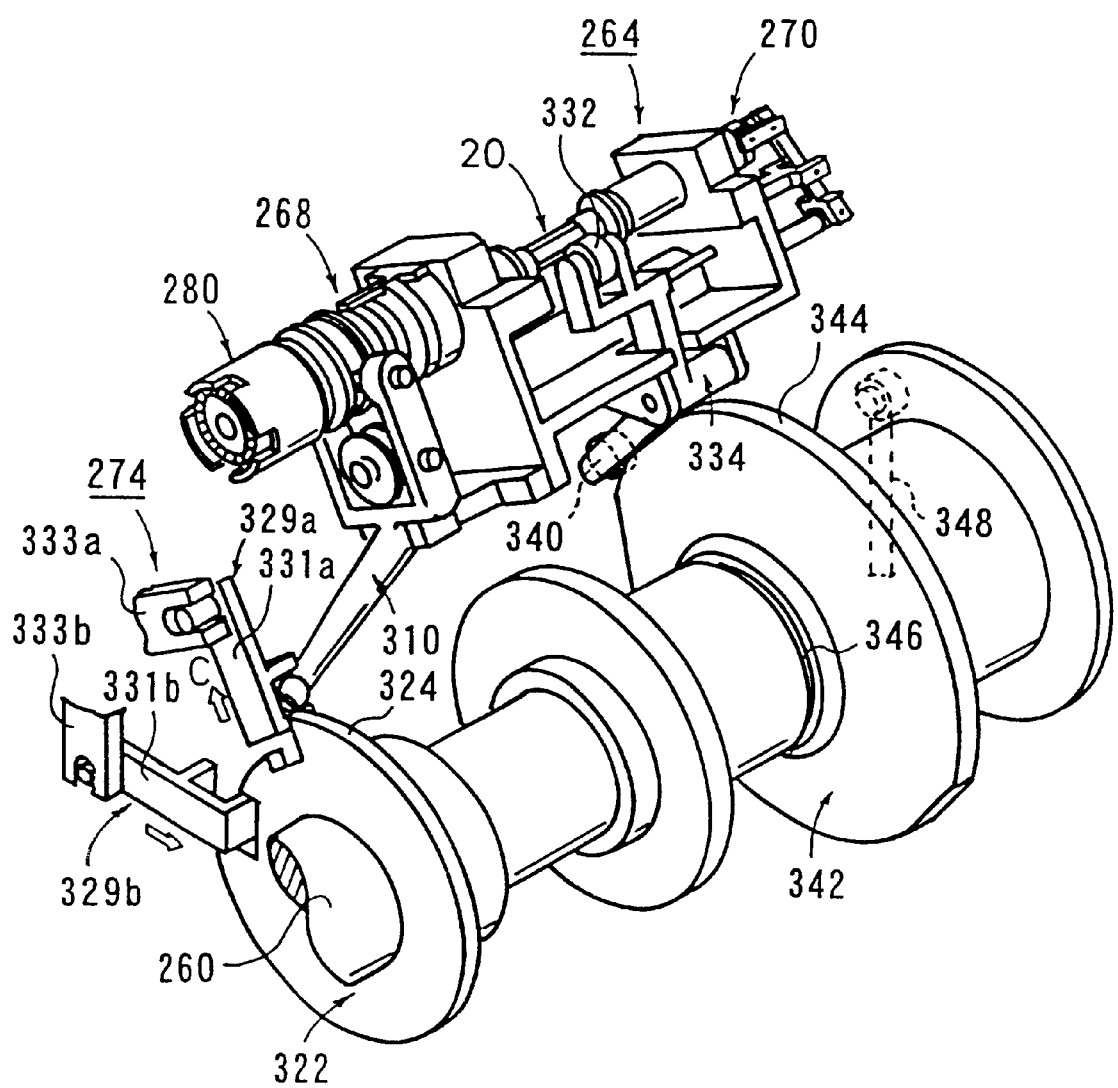
FIG. 21 is a fragmentary perspective view of the film coiling unit and a cam mechanism.
Figure 22:
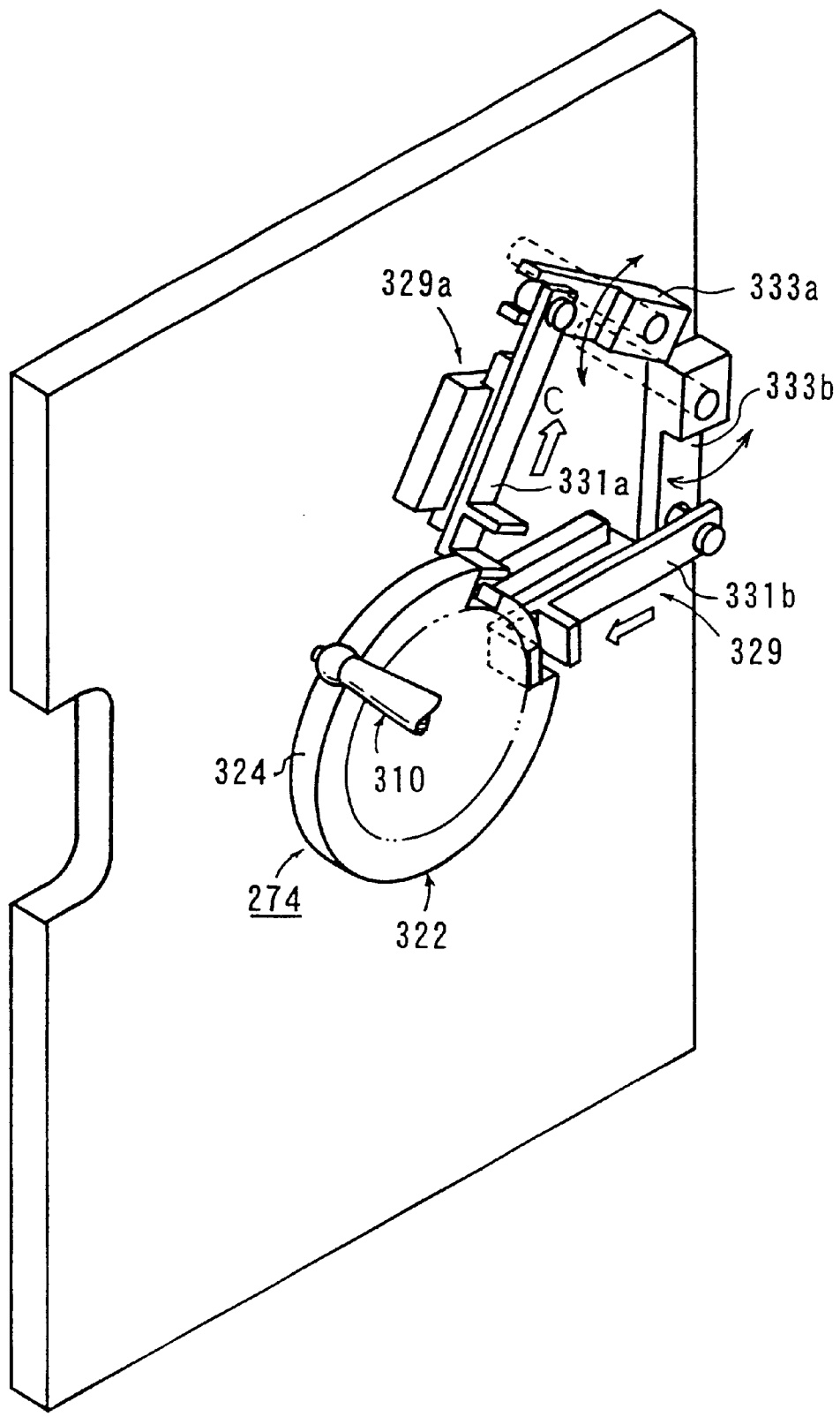
FIG. 22 is a perspective view of the film cam mechanism.
Figure 23:
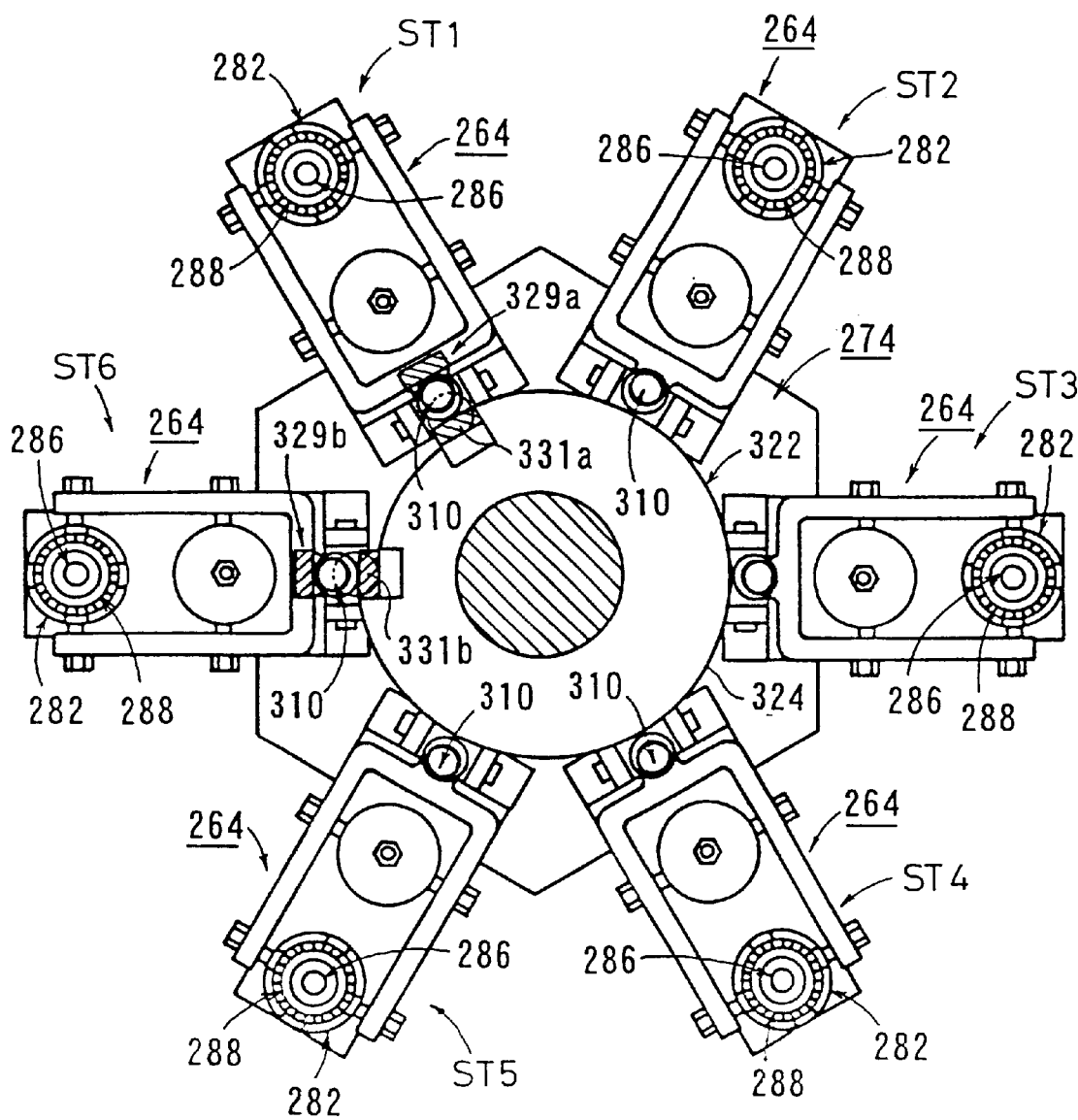
FIG. 23 is a front elevational view, partly cut away, of the film coiling unit.

As show in FIGS. 21 through 23, the spool supply station ST1 has a first cam mechanism 329a for converting a spool chuck mechanism 264 from a spool releasing state to a spool gripping state, and the transfer station ST6 has a second cam mechanism 329b for converting the spool chuck mechanism 264 from a spool gripping state to a spool releasing state. The first and second cam mechanisms 329a, 329b have respective first and second fingers 331a, 331b movable radially along the first cam 322 while holding the end of the swing arm 310, and respective first and second links 333a, 333b for moving the respective first and second fingers 331a, 331b radially.

Figure 15:
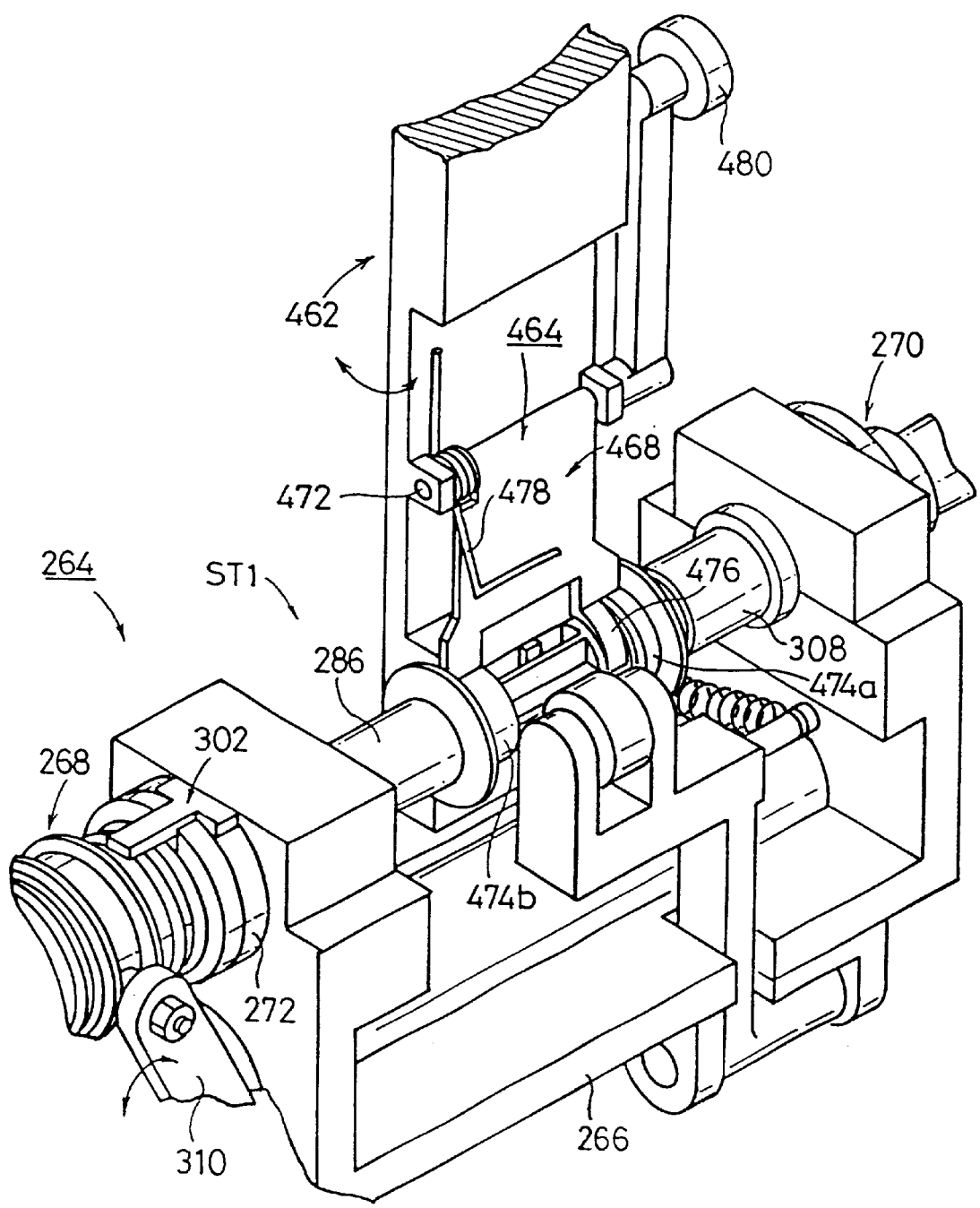
FIG. 15 is a perspective view of a spool chuck mechanism on a first turntable.

As shown in FIGS. 15 through 17, a presser roller 332 for holding the end of a sized film 16 wound around the spool 20 is swingably mounted on the support block 266 by a swing member 334. The swing member 334 is swingably mounted on the support block 266 by a support shaft 336, and has a pair of attachment arms 338 on an end thereof which are spaced a given distance from each other. The presser roller 332 is rotatably mounted on and between the attachment arms. The presser roller 332 is normally urged toward the spool 20 by a spring 339 connected to the swing member 334. A cam roller 340 is mounted on an opposite end of the swing member 334 and held in rolling contact with a cam surface 344 of a second cam member 342.

Figure 24:
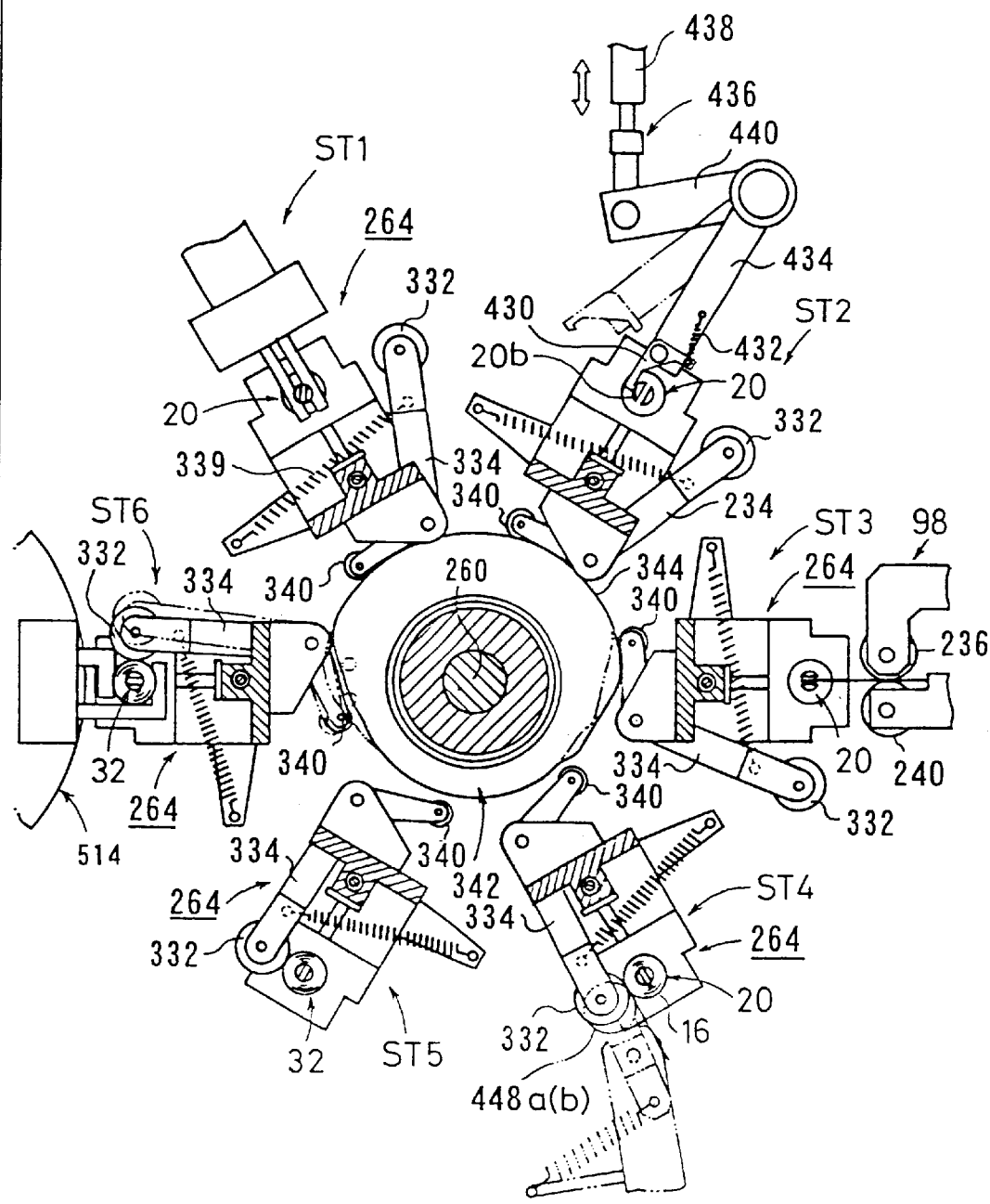
FIG. 24 is another front elevational view, partly cut away, of the film coiling unit.

As shown in FIGS. 20 and 21, the second cam member 342 is rotatably mounted on the main shaft 260 by bearings 346, and has an end to which a cam rod 348 is coupled. As shown in FIG. 24, the cam surface 344 has a cam profile shaped such that the cam roller 340 held in rolling contact with the cam surface 344 causes the presser roller 332 to press the end of the sized film 16 wound around the spool 20 between the prewinding station ST4 and the transfer station ST6. In the transfer station ST6, the cam rod 348 operates to move the presser roller 332 toward and away from the end of the sized film 16.

Figure 25:
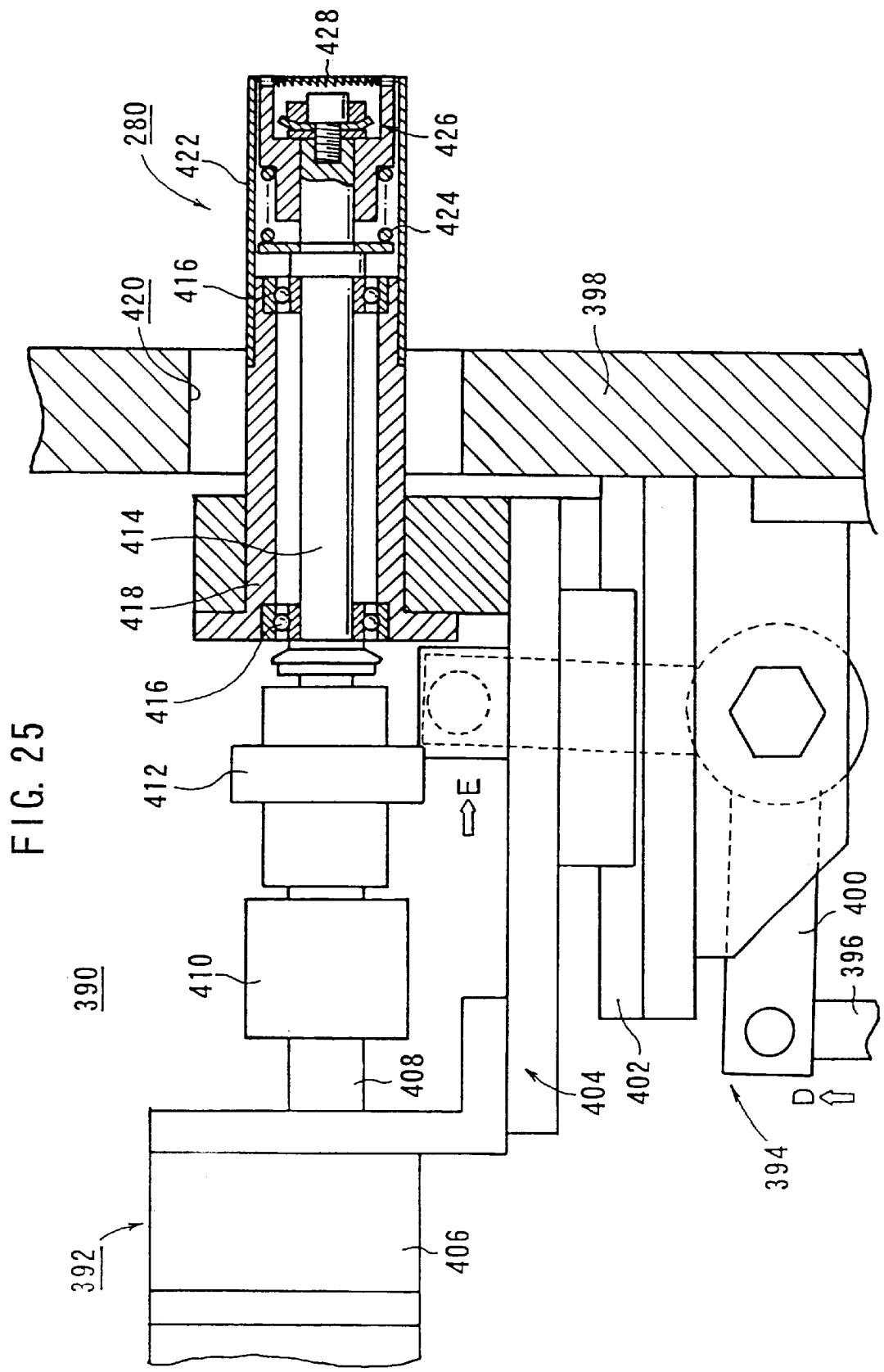
FIG. 25 is a side elevational view, partly cut away, of a rotating and positioning mechanism of the film coiling unit.
Figure 26:
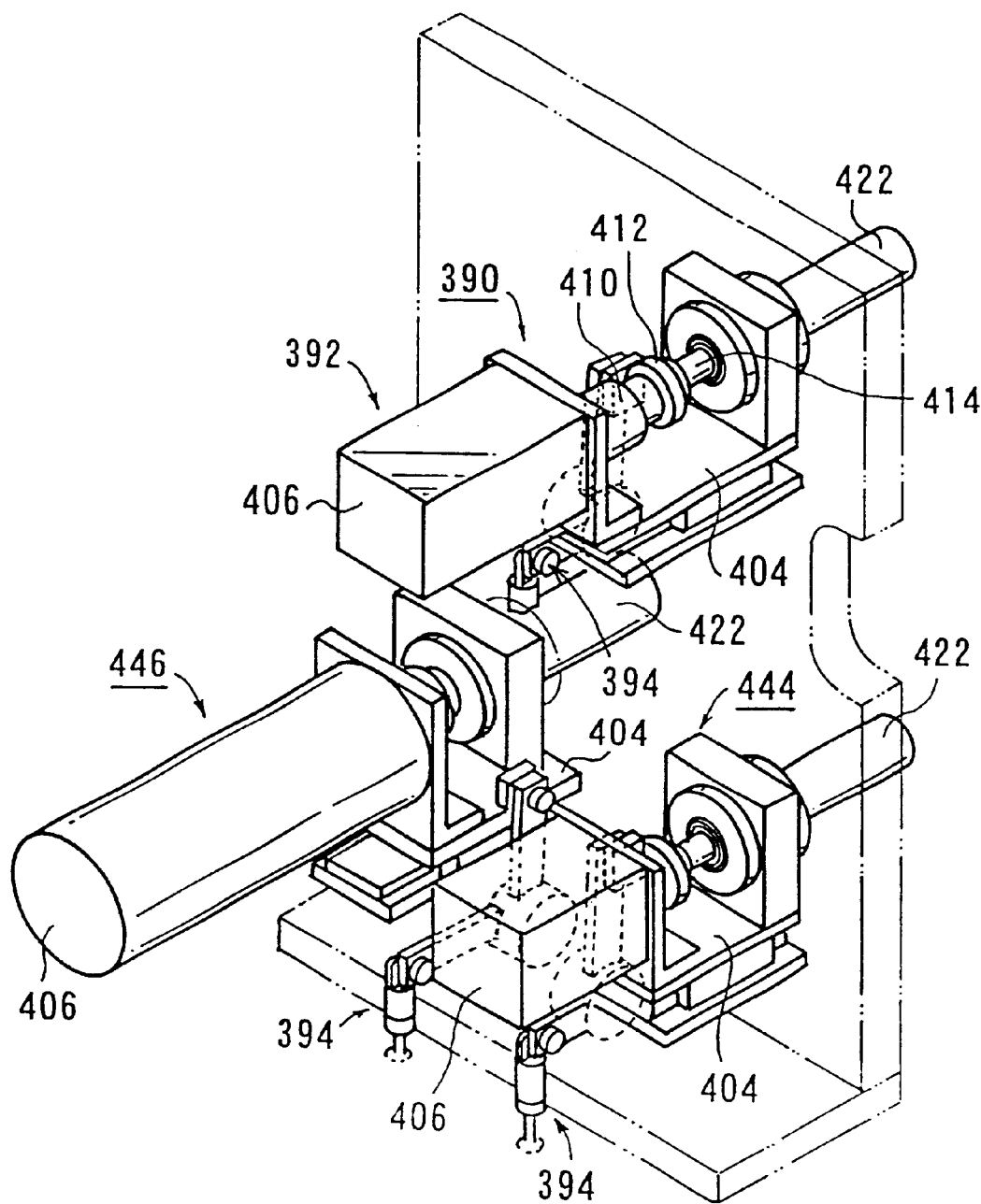
FIG. 26 is a fragmentary perspective view of a spool rotating mechanism of the film coiling unit.

As shown in FIGS. 20, 25, and 26, the spool positioning inspecting station ST2 has a rotating and positioning mechanism 390 for positioning a spool 20 held by the spool chuck mechanism 264. The rotating and positioning mechanism 390 has a spool rotating mechanism 392 which is movable toward and away from the first support assembly 268 of the spool chuck mechanism 264 by a cam mechanism 394.

The cam mechanism 394 has a swing arm 400 which is angularly movable with respect to a base plate 398 by a cam rod 396. A horizontal guide plate 402 is mounted on the base plate 398, and a slide base 404 is mounted on the guide rail 402 for movement toward and away from the base plate 398. The swing arm 400 has an end engaging the slide base 404.

The spool rotating mechanism 392 has a motor 406 fixed to the slide base 404 and having a drive shaft 408 to which a magnetic torque control mechanism 410 is coupled. The magnetic torque control mechanism 410 has an output shaft connected by a coupling 412 to a rotatable shaft 414 that is rotatably supported in a sleeve 418 by bearings 416 (see FIG. 25).

The sleeve 418 projects through a hole 420 defined in the base plate 398 toward the turntable 262, and supports on its outer circumferential surface a clutch drive sleeve 422 engageable with the clutch sleeve 282 of the mechanical clutch 280 for pressing the clutch sleeve 282 in a direction away from the clutch member 288. A clutch member 426 biased by a spring 424 is axially movably mounted on the rotatable shaft 414, and has on its distal end a gear 428 for meshing engagement with the gear 294 of the clutch member 288.

As shown in FIG. 24, the rotating and positioning mechanism 390 has an engaging finger 430 for engaging the step 20b of the spool 20 when the spool 20 is to be rotated by the spool rotating mechanism 392, an arm 434 on which the engaging finger 430 is swingably supported with a spring 432 acting between the arm 434 and the engaging finger 430, and a cam assembly 436 for angularly moving the arm 434 with respect to the spool 20. The cam assembly 436 comprises a cam rod 438 coupled to an actuator (not shown) for back-and-forth movement, and a link 440 having an end coupled to the cam rod 438 and an opposite end coupled to the arm 434.

As shown in FIG. 5, the spool positioning inspecting station ST2 has an inspecting device 441 for inspecting the positioning of the spool 20. The inspecting device 441 has a photosensor, for example, which detects the groove 20a of the spool 20 (see FIG. 1) to detect the position of the spool 20. If desired, the spool positioning inspecting station ST2 may have another device having a photosensor for inspecting whether the flanges of the spool 20 are defective or not upon rotation of the spool 20.

The inserting station ST3 has an insertion detecting device 442 for detecting when the leading end 16a of the elongate film F or the sized film 16 fed from the film supply unit 18 is inserted into the groove 20a in the spool 20 which is held by the spool chuck mechanism 264. The insertion detecting device 442 has a microswitch (not shown) which is actuated when the leading end 16a is inserted into the groove 20a and projects outwardly.

The prewinding station ST4 and the winding station ST5 have a prewinding mechanism 444 and a winding mechanism 446 (see FIGS. 20 and 26) each functioning as a spool winding mechanism. The prewinding mechanism 444 and the winding mechanism 446 are substantially identical in structure to the spool rotating mechanism 392. Those parts of the prewinding mechanism 444 and the winding mechanism 446 which are identical the spool rotating mechanism 392 are denoted by identical reference characters, and will not be described in detail below.

As shown in FIG. 5, the prewinding station ST4 has a pair of touch rollers 448a, 448b for pressing the sized film 16 when the sized film 16 is wound around the spool 20, the touch rollers 448a, 448b being vertically movable and angularly movable. As shown in FIG. 4, the prewinding station ST4 also has a film guide 450 and a pair of first and second photosensors 452a, 452b spaced a predetermined distance from each other along the film guide 450. In the prewinding station ST4, when the trailing end 16c of the sized film 16 to be prewound on the spool 20 passes across the first photosensor 452a, the prewinding mechanism 444 is decelerated, and when the trailing end 16c of the sized film 16 to be prewound on the spool 20 passes across the second photosensor 452b, the prewinding mechanism 444 is inactivated.

The winding mechanism 446 is associated with a third photosensor 454 which detects when the sized film 16 is wound around the spool 20 under a predetermined condition.

As shown in FIG. 5, a spool positioning and supplying unit 460 is disposed outside of the first turntable 262. The spool positioning and supplying unit 460 has a second turntable 462 intermittently rotatable clockwise in the direction indicated by the arrow. The second turntable 462 has four spool chuck mechanisms 464, for example, mounted at equal angular intervals thereon. The second turntable 462 has a spool receiving station ST1a, a spool positioning station ST2a, and the spool supply station ST1 which are successively angularly positioned clockwise (in the direction indicated by the arrow) in the order named.

Figure 27:
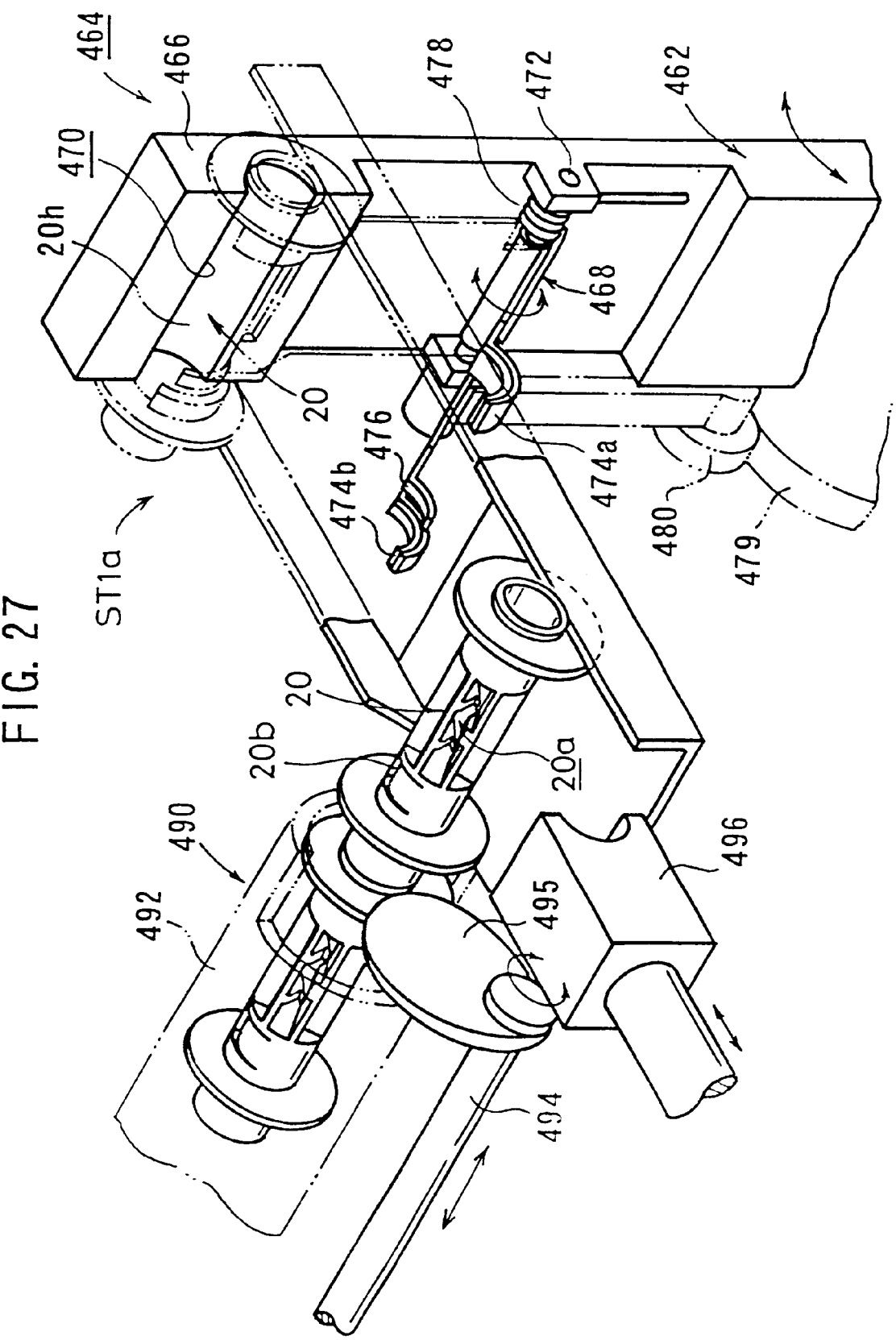
FIG. 27 is a perspective view of a spool chuck mechanism of a spool positioning and supplying unit.

As shown in FIGS. 15 and 27, each of the spool chuck mechanisms 464 comprises a spool shank holder base 466 integral with an end of the second turntable 462, and a spool shank chuck 468 angularly movable with respect to the spool shank holder base 466. The spool shank holder base 466 has such a length as to receive therein a shank 20h of the spool between the flanges 20f, 20g, and has a spool shank engaging groove 470 defined therein along its length. The spool shank engaging groove 470 has a diameter which is greater than the diameter of the shank 20h of the spool 20 by a range from +2.0 mm to +0.4 mm.

The spool shank chuck 468 has an end fixed to a rotatable shaft 472 rotatably supported on the second turntable 462 and has a pair of fingers 474a, 474b on its opposite end which are curved complementarily to the shank 20h of the spool 20. Pads of a material having a large coefficient of friction, i.e., rubber, are applied to inner surfaces of the fingers 474a, 474b. The spool shank chuck 468 also has a spool positioning finger 476 positioned near one of the fingers 474a which is narrower than the other finger 474b. The spool positioning finger 476 serves to engage the step 20b of the spool 20 thereby positioning the spool 20.

A spring 478 is mounted on the rotatable shaft 472 for normally urging the spool shank chuck 468 toward the spool shank holder base 466. A cam follower 480 engaging a rotary cam 479 is mounted on one end of the rotatable shaft 472 (see FIG. 27).

As shown in FIG.5 and FIG. 27, the spool receiving station ST1 has a spool supply unit 490 having an air chute 492 and a stopper 494 positioned at an end of the air chute 492.

In order to place a spool 20 fed by the air chute 492 at an ejecting position one at a time, the stopper 494 serves to hold a next spool 20 in the air chute 492. The stopper 494 is rotatable about its own axis and supports an eccentric cam 495 on an end thereof, the eccentric cam 495 having a varying thickness for returning the next spool in a direction opposite to the direction in which the spool 20 is fed in the air chute 492. The air chute 492 may be replaced with a conveyor.

A pusher 496 is disposed in the ejecting position for pushing the spool 20 from the ejecting position toward the spool chuck mechanism 464 in the spool receiving station ST1a.

Figure 28:
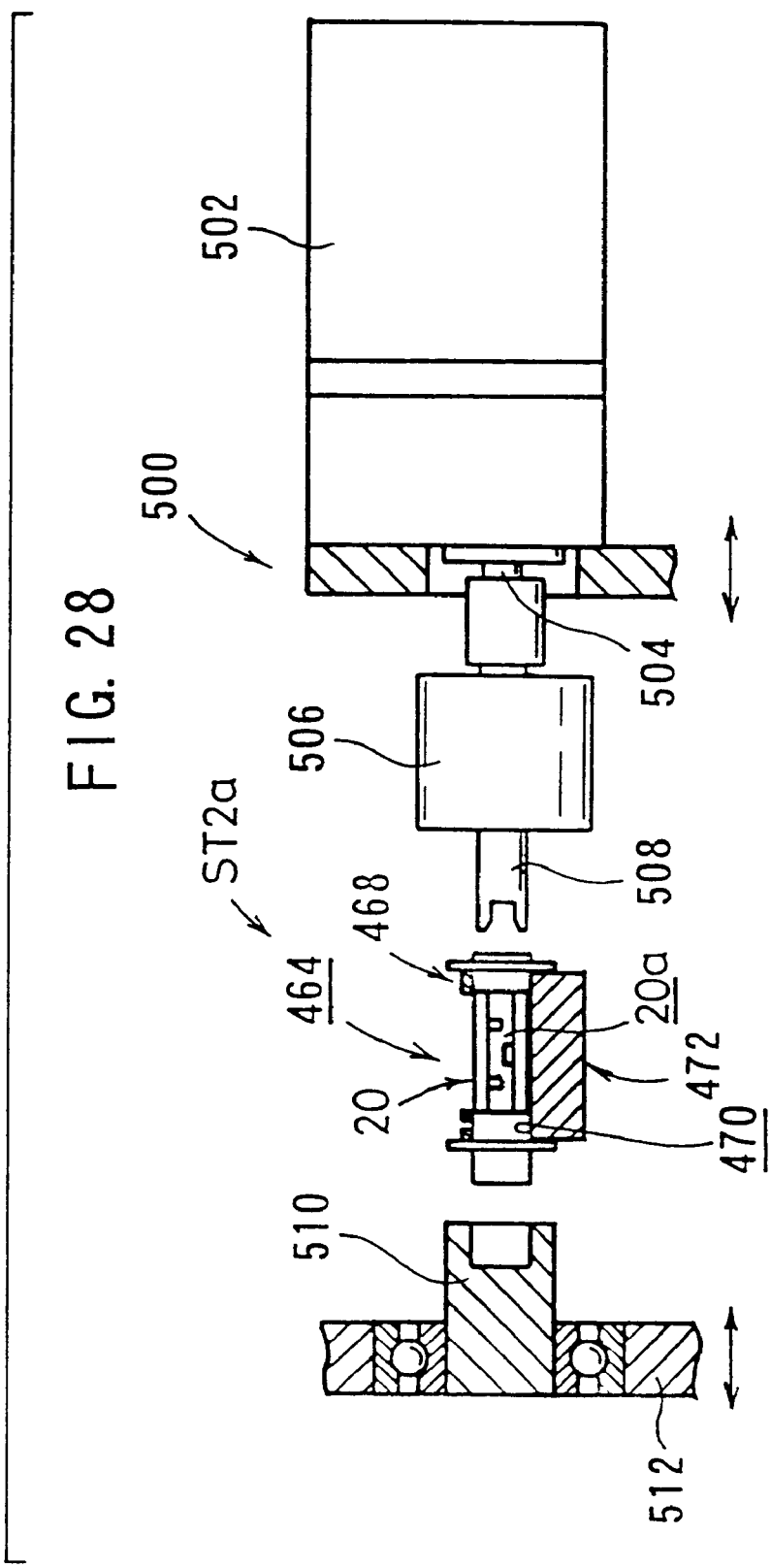
FIG. 28 is a fragmentary vertical cross-sectional view of a spool positioning assembly.

The spool positioning station ST2a has a spool positioning unit 500 (see FIG. 28). As shown in FIG. 28, the spool positioning unit 500 has a motor 502 which is movable toward and away from the second turntable 482 by a displacing mechanism (not shown). The motor 502 has a drive shaft 504 to which there is coupled a hysteresis clutch 506 with a rotatable pin 508 joined thereto. The rotatable pin 508 can be fitted into one of the ends of the spool 20. A rotatable sleeve 510 rotatably supported on a bracket 512 is disposed in axially confronting relation to the rotatable pin 508 for engagement with the other end of the spool 20. The bracket 512 is movable toward and away from the second turntable 482 by an actuating mechanism (not shown).

As shown in FIG. 4, a first transfer unit 514 and a second transfer unit 516 are disposed downstream of the film coiling unit 22. When the first transfer unit 514 receives the film coil 32 with the sized film 16 wound around the spool 20 from the spool chuck mechanism 264 and turns the film coil 32 by 180°, the first transfer unit 514 angularly moves the film coil 32 from a horizontal attitude to a vertical attitude. The second transfer unit 516 inserts the film coil 32 received from the first transfer unit 514 into the cartridge 28 with one open end which is placed on an index table 518 of the assembling unit 36.

A discharge chute 520 is disposed closely to the second transfer unit 516. To the discharge chute 520, there are discharged film coils 32 with a coiling failure and spools 20 with no sized film 16 wound therearound by a discharging unit (not shown).

The encasing unit 42 comprises an index table 522 which can successively be indexed to index positions associated with a station for supplying a case 38, a station for inserting an assembled cartridge 34 into the case 38, a station for detecting whether there is an assembled cartridge 34 or not, a station for inserting a case cap 40 into the open end of the case 38, a station for discharging a normal packaged product 12, and a station for discharging a defective pakaged product 12.

As shown in FIG. 2, the film producing and packaging system 10 is controlled by an in-factory network including a computer 530. The film producing and packaging system 10 is divided into a plurality of blocks that are individually controlled by respective computers under the control of the computer 530.

Operation of the film producing and packaging system 10 with respect to the method of processing a film according to the first embodiment will be described below.

As shown in FIG. 4, the feeder 70 in the film supply unit 18 is operated to rotate the film roll 14 clockwise in the direction indicated by the arrow to deliver the leading end of the unreeled new elongate film F to the splicer 72. The elongate film F passes through the splicer 72 to the perforator 76 which forms perforations 74 in opposite sides of the elongate film F.

The perforated elongate film F is fed to the side printer 78 where latent images of strip-like prints depending on the film type are formed on one or both sides of the elongate film F by the first printing mechanism 80. The printed elongate film F forms a free loop, after which the second printing mechanism 82 above the sprocket 114 records a DX bar code, frame numbers, frame number bar codes, a commercial name, depending on the film size as latent images on one or both sides of elongate films F.

The elongate film F which has passed through the side printer 78 is fed into the film cutting and inserting device 90. The film cutting and inserting device 90 is controlled to switch between two modes of operation depending on the length of the sized film 16 to be wound around the spool 20. Specifically, as shown in FIG. 5, the film cutting and inserting device 90 operates in one mode if the sized film 16 has 12 frames or more and hence is longer than a distance H from the cutting position in the cutting mechanism 92 to the position where the leading end of the sized film 16 is inserted into the spool 20, and in the other mode if the sized film 16 has 10 frames or less and hence is shorter than the distance H.

A process of positioning the spool 20 in the inserting station ST3 where the leading end of the sized film 16 is inserted into the spool 20 will first be described below. As shown in FIG. 27, spools 20 are successive fed in and along the air chute 492 of the spool supply unit 490, and only the leading spool 20 is placed in the ejecting position by the stopper 494. The pusher 496 is operated to deliver the leading spool 20 toward the spool chuck mechanism 464 disposed in the spool receiving station ST1a.

In the spool chuck mechanism 464, the cam follower 480 is held in engagement with the rotary cam 479, holding the spool shank chuck 468 away from the spool shank holder base 466. The shank 20h of the spool 20 delivered by the spool chuck mechanism 464 is placed in the spool shank engaging groove 470 in the spool shank holder base 466. When the cam follower 480 is angularly displaced by the rotary cam 479, the spool shank chuck 468 is swung toward the spool shank holder base 466 under the bias of the spring 478. The spool 20 on the spool shank holder base 466 is pressed by the fingers 474a, 474b of the spool shank chuck 468, and hold against the spool shank holder base 466.

Then, the pusher 496 is retracted, and the second turntable 462 is turned about 90° in the direction indicated by the arrow in FIG. 5, bringing the spool 20 held by the spool chuck mechanism 464 to the spool positioning station ST2a, As shown in FIG. 28, in the spool positioning station ST2a, the bracket 512 and the motor 502 of the spool positioning unit 500 are displaced toward the opposite ends of the spool 20.

Therefore, the rotatable sleeve 510 rotatably supported on the bracket 512 is fitted over one of the ends of the spool 20, and the rotatable pin 508 coupled to the drive shaft 504 of the motor 502 by the hysteresis clutch 506 is inserted into the other end of the spool 20. When the motor 502 is then energized, the rotatable pin 502 is rotated while being held in engagement with key in the shank end of the spool 20 under magnetic forces, thereby rotating the spool 20 about its own axis.

The spool 20 is held by the spool shank chuck 468 of the spool chuck mechanism 464. When the spool 20 is rotated, the spool positioning finger 476 of the spool shank chuck 468 abuts against the step 20b of the spool 20, whereupon the spool 20 stops its rotation. The spool 20 is now positioned with respect to the spool chuck mechanism 464.

The second turntable 462 is turned about 90° for placing the positioned spool 20 in the spool supply station ST1. In the spool supply station ST1, one of the spool chuck mechanisms 246 on the first turntable 262 is positioned. Therefore, as shown in FIGS. 15 and 17, the spool 20 held by the spool chuck mechanism 464 is disposed between the first and second support assemblies 268, 270 of the spool chuck mechanism 264.

As shown in FIGS. 17, 21, and 22, the first cam mechanism 329a of the cam mechanism 274 is actuated to cause the first finger 331a to move the end of the swing arm 310 in the direction indicated by the arrow C. Consequently, the swing arm 310 presses the movable sleeve 276 toward the spool 20, and causes the cam 314 to push the rod 316 in the direction indicated by the arrow, pressing the slide pin 306 coupled to the rod 316 by the link 319 toward the spool 20. The opposite ends of the spool 20 are now gripped by the holder shaft 286 and the rotatable sleeve 308 and released from the spool chuck mechanism 464.

Specifically, the shorter boss 20d of the spool 20 is held by the stepped inner circumferential surface 296a of the cylindrical body 296 of the holder shaft 286, and the longer boss 20e of the spool 20 is held by the stepped inner circumferential surface 308a of the rotatable sleeve 308. Therefore, the end face of the shorter boss 20d and the end face of the longer boss 20e are supported respectively by the cylindrical body 296 and the rotatable sleeve 308, thereby centering the spool 20 in its axial direction. The outer circumferential surface of the shorter boss 20d and the outer circumferential surface of the longer boss 20e are held respectively by the cylindrical body 296 and the rotatable sleeve 308, thereby centering the spool 20 in its radial direction.

Therefore, the spool 20 is centered highly accurately in its radial direction, and the axial center of the spool 20 and the center of the elongate film F inserted in the groove 20a are brought highly accurately into alignment with each other, so that the elongate film F can be wound around the spool at a high speed. The distance that the first and second support assemblies 268, 270 move linearly is smaller than if the spool 20 were centered by supporting the flanges 20f, 20g, with the result that the elongate film F can be wound around the spool at a high speed.

Since the position to which the first support assembly 268 is moved axially of the spool 20 is mechanically determined by the cam mechanism 274, the cylindrical body 296 serves as a spool positioning reference. Since the rotatable sleeve 308 of the second support assembly 270 is actuated via the spring 318, the end face of the longer boss 20e of the spool 20 is pressed and positioned by the rotatable sleeve 308. Because the spool 20 is positioned with respect to the shorter boss 20d, the centering mechanism is simple and operates for good positioning reproducibility.

The spool 20 has high dimensional accuracy if it is molded of polystyrene particularly for use with a 135 mm film. Therefore, when such a spool 20 is centered, it is free of the effect of errors which would be caused by parts thereof. The spool 20 may be centered axially using the flanges 20f, 20g, and radially using outer circumferential surfaces of the shorter boss 20d and the longer boss 20e.

When the spool 20 positioned in the spool positioning station ST2a is supported at its opposite ends by the spool chuck mechanism 264, the first and second turntables 262, 462 are turned respective angles in the direction indicated by the arrow in FIG. 5, bringing the spool chuck mechanism 264 holding the spool 20 to the spool positioning inspecting station ST2.

In the spool positioning inspecting station ST2, the cam rod 396 of the cam mechanism 394 of the rotating and positioning mechanism 390 is displaced upwardly in the direction indicated by the arrow D, as shown in FIGS. 20 and 25. Therefore, the slide base 404 is displaced along the guide rail 402 by the swing arm 400 toward the first support assembly 268 of the spool chuck mechanism 264 in the direction indicated by the arrow E.

The sleeve 418 of the spool rotating mechanism 392 is disposed on the slide base 404. The clutch drive sleeve 422 fixed to the distal end of the sleeve 418 abuts against the clutch sleeve 282 of the first support assembly 268, whereupon the clutch sleeve 282 moves toward the spool against the bias of the spring 284. Therefore, as shown in FIG. 17, the clutch surface 292 of the clutch sleeve 282 is released from the clutch surface 290 of the clutch member 288, and the gears 428, 294 of the clutch members 426, 288 are brought into mesh with each other. Thus, the mechanical clutch 280 is engaged.

As shown in FIG. 24, the arm 434 has been displaced closely to the spool 20 held by the spool chuck mechanism 264 by the cam assembly 436 until the engaging finger 430 mounted on the arm 434 and biased by the spring 432 engages the spool 20. The motor 406 is energized to rotate the drive shaft 408 to rotate the rotatable shaft 414, whereupon the clutch member 426 splined to the rotatable shaft 414 is rotated (see FIG. 17). Because the clutch member 288 meshes with the clutch member 426, the holder shaft 286 rotates in unison with the clutch member 288.

The spool 20 is held by the holder shaft 286 and the rotatable sleeve 308, and hence is rotated by the holder shaft 286. When the engaging finger 430 held in contact with the outer circumferential surface of the spool 20 engages the step 20b thereof, the spool 20 stops its rotation, and the rotational power from the motor 406 is cut off by the magnetic torque control mechanism 410. The angularly positioning of the spool 20 is now ended. In the spool positioning inspecting station ST2, the inspecting device 441 inspects whether the spool 20 has been positioned in a desired attitude or not. In the spool positioning inspecting station ST2 or the spool positioning station ST2a, the spool 20 is inspected for flange defects.

After the spool 20 has been positioned, the arm 434 is swung upwardly by the cam assembly 436, causing the engaging finger 430 mounted on the arm 434 to be spaced from the step 20b of the spool 20 to a position out of interference with the rotation of the first turntable 262. The spool rotating mechanism 392 is disposed in a position spaced from the spool chuck mechanism 264 by the cam mechanism 394.

A spool 20 which has been found acceptable by various inspecting processes is placed in the inserting station ST3 where a sized film 16 is inserted into the groove 20a in a spool 20. A spool 20 which has been found defective is shifted together with a defect signal to the inserting station ST3, whereupon the supply of a sized film 16 is stopped.

The defect signal of the spool 20 which has been found defective is shifted successively through the stations on the first turntable 262, and the winding of a sized film 16 in the prewinding station ST4 and the winding station ST5 is stopped. After the spool 20 is delivered to the first and second transfer units 514, 516, the spool is discharged into the discharge chute 520 by the discharging unit, as with a defective film coil 32, as shown in FIG. 4.

According to the first embodiment, as described above, the spool 20 positioned in the spool positioning station ST2a of the spool positioning and supplying unit 460 is held by the spool chuck mechanism 264 on the first turntable 262 and delivered to the inserting station ST3, and before the spool 20 is placed in the inserting station ST3, the spool is inspected for its positioning and flange defects.

Therefore, the sized film 16 is prevented from being inserted into a defective spool 20, and hence from being discarded, resulting in an economical consumption of the film material. Particularly, in as much as the spool 20 is inspected before it is placed in the inserting station ST3, any defect of the spool 20 can reliably be detected, and the sized film 16 can be inserted into a normal spool 20 only. Thus, it is possible to manufacture high-quality packaged products 12 efficiently and reliably.

A process of cutting off and inserting a sized film 16 of 12 frames or more (normal mode) will be described below with reference to FIG. 29 and 30A through 30D. In the normal mode, the first cam assembly 120 of the cam switching mechanism 100 is actuated (see FIG. 8A), and the first cam follower 212a of the cam switching unit 184 engages the first cam 214a.

First, the servomotor 103 of the first feed mechanism 94, the servomotor 186 of the second feed mechanism 96, and the insertion motor 232 of the inserting mechanism 98 are energized in synchronism with each other. The elongate film F is now delivered in the direction indicated by the arrow A by the rotating sprocket 102 which engages in the perforations 74 in the opposite sides of the elongate film F. The leading end of the elongate film F passes through the cutting mechanism 92 into the nip roller pair 180 of the second feed mechanism 96.

In the nip roller pair 180, since the drive roller 188 is rotated, the elongate film F is gripped and fed by the drive roller 188 and the driven roller 190 in the direction indicated by the arrow A, and supported at its opposite sides in the film guide grooves 202a, 202b defined in the respective guide members 200a, 200b. The leading end of the elongate film F is inserted between the first inserting roller 234 and the first pinch roller 238 of the inserting mechanism 98 (see FIG. 30A). Furthermore, the leading end of the elongate film F is guided by the guide plates 248a, 248b and inserted between the second inserting roller 236 and the second pinch roller 240 (see FIG. 30B), after which the leading end of the elongate film F is inserted into the groove 20a in the spool 20 which is supported on the first turntable 262 (see FIG. 30C).

When the leading end of the elongate film F has been delivered to the inserting mechanism 98, the film guide 182 is opened. Specifically, as shown in FIG. 10, the drive shaft 216 is rotated to rotate the first and second cam assemblies 214a, 214b in unison with each other, and the first cam follower 212a engaging the first cam assembly 214a moves along the cam profile surface of the first cam assembly 214a.

Since the first cam follower 212a is mounted on the end of the first swing plate 210a, the first swing plate 210a is turned with the movable sleeve 208 about the rod 206. When the movable sleeve 208 is turned in a certain direction, the swing lever 220 integral with the movable sleeve 208 swings, causing the joint rod 224 to turn the swing link 226 about the shaft 228.

The angular movement of the swing link 226 is converted by the link 230 into rotation of the rotatable shafts 196a, 196b, turning the guide members 200a, 200b supported on the rotatable shafts 196a, 196b by the joint bars 198a, 198b in directions away from each other. The elongate film F is now released from the film guide 182.

The leading end of the elongate film F fed into the inserting mechanism 98 is inserted into the groove 20a in the spool 20 on the first turntable 262, and extended from the opposite side of the spool 20. At this time, the microswitch (not shown) of the insertion detecting device 442 is actuated (see "INSERTION DETECTED" in FIG. 29). Based on a drive signal from the insertion detecting device 442, the insertion guide 242 of the inserting mechanism 98 is actuated to turn the guide plates 248a, 248b in directions away from each other (opening directions) for thereby releasing the elongate film F.

The first and second pinch rollers 238, 240 mounted on the guide plates 248a, 248b are angularly moved in unison with the guide plates 248a, 248b, and the insertion motor 232 is de-energized.

The elongate film F is fed a preset length from the cutting position in the direction indicated by the arrow A by the sprocket 102 and the nip roller pair 180, forming a loop between the spool 20 and the nip roller pair 180. When the elongate film F is fed the preset length, the sprocket 102 and the nip roller pair 180 are inactivated, and the cutting mechanism 92 is actuated (ON) (see FIG. 30D).

Specifically, as shown in FIGS. 6 and 7, the first cam follower 130 engages the first cam 126 which rotates in unison with the drive shaft 124, and is displaced along the first cam profile surface 136. The displacement of the first cam follower 130 is converted into angular movement of the first swing plate 146, and the support shaft 152 fixed to the other end of the first swing plate 146 is swung about the rod 142.

As shown in FIG. 6, the swing link 158 is coupled to the support shaft 152 by the connecting rod 156. The swing link 158 swings about the shaft 160, causing the long link 114 to swing downwardly about the pivot 116. The short link 112 engaging the long link 114 causes the vertically movable base 108 to move downwardly along the rail 110. The movable blade 106 is lowered to cut (trim) the elongate film F with the movable blade 106 and the fixed blade 104.

When the nip roller pair 180 is actuated, the trailing end 16c of the sized film 16, which has been cut to a predetermined length by the cutting mechanism 92, is fed in the direction indicated by the arrow A. Therefore, trailing end 16c of the sized film 16 is released from the nip roller pair 180, and only the leading end 16a thereof is inserted into and supported by the spool 20.

As shown in FIG. 5, the first turntable 262 is angularly moved a predetermined angle in the direction indicated by the arrow, bringing the spool chuck mechanism 264 holding the spool 20 into the prewinding station ST4. In the prewinding station ST4, the prewinding mechanism 444 is actuated to press the clutch sleeve 282 toward the spool 20 against the bias of the spring 284, as shown in FIG. 17. The cylindrical body 296 is rotated with the clutch surfaces 290, 292 spaced from each other. The sized film 16, whose leading end 16a is retained by the spool 20, is prewound to a predetermined length around the spool 20.

At this time, as shown in FIG. 4, when the trailing end 16a of the sized film 16 passes across the first photosensor 452a, the rotational speed of the shank 20h is reduced, and when the trailing end 16c is detected by the second photosensor 452b, the spool 20 is stopped against rotation. After the touch rollers 448a, 448b have been spaced from the spool 20, the first turntable 262 is rotated. When the spool chuck mechanism 264 holding the spool 20 with the prewound film reaches the winding station ST5, the winding mechanism 446 is actuated. The sized film 16 is now wound around the spool 20, producing a film coil 32.

The film coil 32 is delivered to the transfer station ST6, in which the film coil 32 is released from the spool chuck mechanism 264 by the second cam mechanism 329b and then delivered to the first transfer unit 514. The film coil 32 is turned 90° from the horizontal attitude to the vertical attitude, and then gripped by the second transfer unit 516 in the vertical attitude. When the second transfer unit 516 receives the film coil 32 with the wound sized film 16, the second transfer unit 516 delivers the film coil 32 in the upstanding attitude to the index table 518 of the assembling unit 36, and inserts the film coil 32 into a cartridge 28 with one open end placed on the index table 518.

A cap 26b is pressed over and staked on the upper open end of the cartridge 28 with the film coil 32 inserted therein, producing an assembled cartridge 34. The assembled cartridge 34 is then fed from the dark room 44 to the bright room 45, and delivered to the encasing unit 42.

In the encasing unit 42, a case 38 is delivered to the index table 522, and then the assembled cartridge 34 is inserted into the case 38. Then, a case cap 40 is inserted into an open end of the case 38, producing a packaged product 12. The packaged product 12 is then delivered to the conveyor 62, and introduced selectively into the packaged film product accumulating units 61a, 61b, 61c.

A process of winding a shorter film, e.g., a sized film 16 of 5 frames, around a spool 20 (short-film mode) will be described below with reference to FIGS. 31 and 32A through 32D.

First, a process of changing the timing of operation of the cutting mechanism 92 and the film guide 182 is carried out. Specifically, as shown in FIGS. 6 and 7, the cylinder 164 of the switching unit 134 is actuated to cause the arm 168 to move the roller cam 170 in the direction indicated by the arrow B1. The flanges 150a, 150b engaged by the roller cam 170 move the movable sleeve 144 in the direction indicated by the arrow B1, displacing the first cam follower 130 away from the first cam profile surface 136 of the first cam 126. The second cam follower 132 engages the second cam profile surface 138 of the second cam 128 (see FIG. 8B). The second cam assembly 122 is now ready to operate.

As shown in FIG. 10, the switching unit 218 of the cam switching unit 184 is actuated. The movable sleeve 208 axially moves, displacing the first cam follower 212a out of engagement with the first cam 214a and displacing the second cam follower 212b into engagement with the second cam 214b.

After the above switching operation is carried out, the feeder 70 is operated to deliver the elongate film F unwound from the film roll 14 into the film cutting and inserting device 90, whereupon the first feed mechanism 94, the second feed mechanism 96, and the inserting mechanism 98 are actuated in synchronism with each other. The elongate film F is fed a preset length in the direction indicated by the arrow A while being guided by the film guide 182 upon rotation of the sprocket 102 and the nip roller pair 180.

Figure 32A:
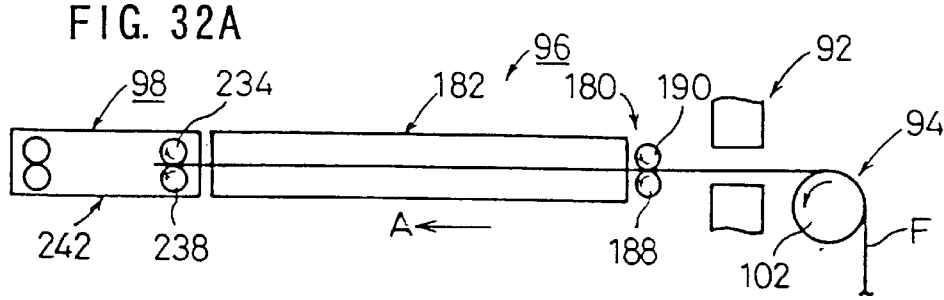
FIG. 32A is a schematic view illustrative of the manner in which the elongate film is fed out.
Figure 32B:
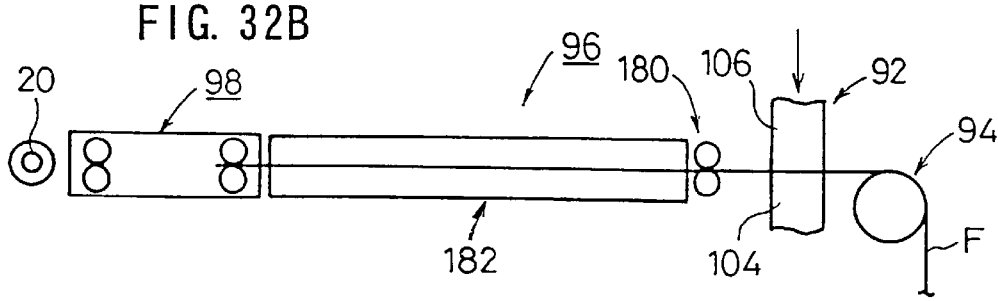
FIG. 32B is a schematic view illustrative of the manner in which the elongate film is cut off.

After the elongate film F is fed the preset length and its leading end is gripped by the first inserting roller 234 and the first pinch roller 238, the first feed mechanism 94, the second feed mechanism 96, and the inserting mechanism 98 are inactivated (see FIG. 32A).

Then, the cutting mechanism 92 is actuated (ON). At this time, the second cam assembly 122 of the cam switching mechanism 100 has been actuated, displacing the second cam follower 212b along the second cam profile surface 138 of the second cam 214b. The swing link 158 swings at an earlier time than in the normal mode, lowering the movable blade 106 in unison with the vertically movable base 108 (see FIG. 32B). Therefore, a shorter film, e.g., a sized film 16 of 5 frames, than the film in the normal mode, Is produced.

Figure 32C:
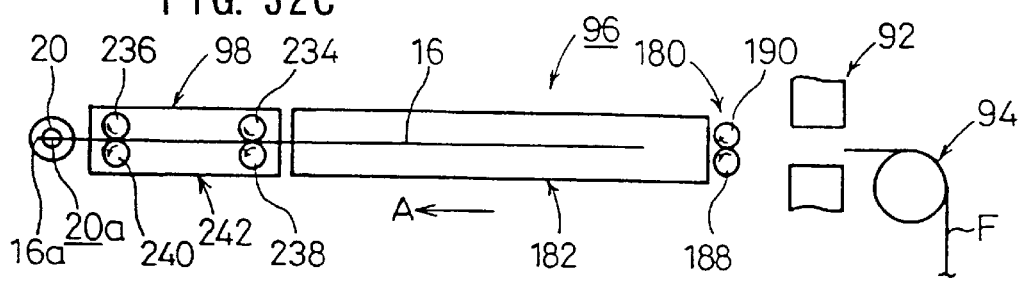
FIG. 32C is a schematic view illustrative of the manner in which a sized film of given length is inserted into a spool.
Figure 32D:
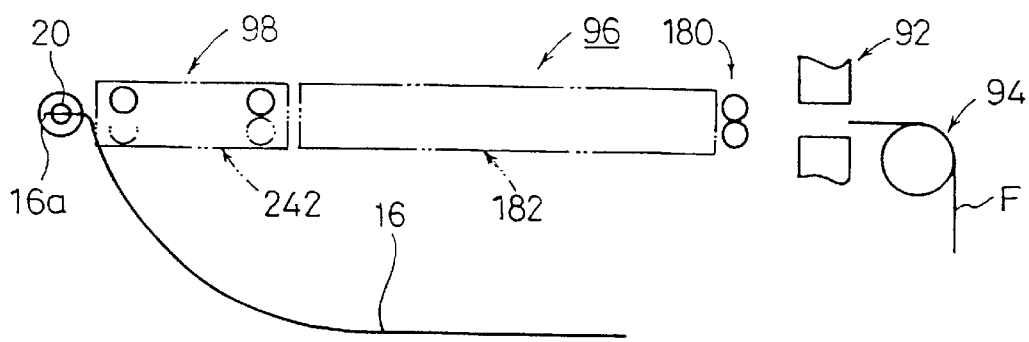
FIG. 32D is a schematic view illustrative of the manner in which the film of given length is released.

As shown in FIG. 32C, the second feed mechanism 96 and the inserting mechanism 98 are actuated to insert the leading end 16a of the sized film 16 into the groove 20a in a spool 20. When the leading end 16a of the sized film 16 is detected by the insertion detecting device 442, the second feed mechanism 96 and the inserting mechanism 98 are inactivated, and the film guide 182 and the insertion guide 242 are activated.

Specifically, as shown in FIG. 10, the second cam follower 212b and the second cam 214b of the cam switching unit 184 angularly move the swing link 226 at a predetermined time, causing the link 230 to impart rotation to the rotatable shafts 196a, 196b. When the rotatable shafts 196a, 196b are rotated, the guide members 200a, 200b swing away from each other, releasing the sized film 16 from the guide grooves 202a, 202b (see FIG. 32D).

In the insertion guide 242, as shown in FIG. 13, the support shafts 246a, 246b are rotated to turn the guide plates 248a, 248b in unison with the first and second pinch rollers 238, 240 in directions away from each other, releasing the sized film 16 (see the solid lines to the two-dot-dash lines in FIG. 13).

If the number of frames of the film ranges from 9 to 10 in the short-film mode, then the cutting mechanism 92 is actuated by the second cam assembly 122, and the film guide 182 is actuated by the first cam 214a and the first cam follower 212a as in the normal mode. The numbers of frames and cam patterns for switching the cutting mechanism 92 and the film guide 182 are shown in the following table:

TABLE 1

| number of frames | cutting mechanism 92 | | film guide 182 | |
|---|---|---|---|---|
| | cam | cam follower | cam | cam follower |
| 12–27 | 126 | 130 | 214a | 212a |
| 9–10 | 128 | 132 | 214a | 212a |
| 5–8 | 128 | 132 | 214b | 212b |

In the first embodiment, if the length of a preset sized film 16 is greater than the distance H from the cutting position of the cutting mechanism 92 to the inserting position for the spool 20, then the cutting mechanism 92 is actuated by the first cam assembly 120 of the cam switching mechanism 100 in the normal mode. The elongate film F is now fed a preset length by the first feed mechanism 94, the second feed mechanism 96, and the inserting mechanism 98 until the leading end of the elongate film F is inserted into the groove 20a in the spool 20. Thereafter, the cutting mechanism 92 is actuated by the first cam assembly 120 for cutting off the elongate film F.

If the length of a preset sized film 16 is smaller than the distance H, the cam switching mechanism 100 switches from the first cam assembly 120 to the second cam assembly 122. The elongate film F is fed a preset length shorter than the distance H, and thereafter the cutting mechanism 92 is actuated by the second cam assembly 122 for cutting off the elongate film F. Then, the shorter sized film 16 is fed by the second feed mechanism 96 and the inserting mechanism 98 until the leading end of the shorter sized film 16 is inserted into the groove 20a in the spool 20.

The different sequences of operation for the normal mode and the short-film mode depending on the preset length of the sized film 16 can be selected by changing the timing of operation of the cutting mechanism 92. The timing of operation of the cutting mechanism 92 can easily and accurately be changed simply by switching between the first and second cam assemblies 120, 122 of the cam switching mechanism 100. Therefore, sized films 16 having various different lengths ranging from shorter films (10 frames or less) to longer films (12 frames or more) can automatically and smoothly be wound around spools 20 according to a simple control process.

In the first embodiment, the timing of operation of the film guide 182 of the second feed mechanism 96 is switched by the cam switching unit 184 depending on the length of a sized film 16. Therefore, sized films 16 having various different lengths can smoothly be guided with a simple arrangement, allowing those sized films 16 to be inserted highly efficiently into spools 20.

In the first embodiment, furthermore, the first and second pinch rollers 238, 240 of the inserting mechanism 98, each split into two roller segments, are mounted on the openable and closable guide plates 248a, 248b. When the guide plates 248a, 248b are angularly moved away from each other, the first and second pinch rollers 238, 240 swing in unison therewith. Accordingly, the film can be released reliably with a simple arrangement.

If a defective elongate film F is introduced into the film cutting and inserting device 90, a defective film discharge signal is produced to bring the film cutting and inserting device 90 into a defective film discharge mode. Specifically, the film coiling unit 22 stops in its origin, the film guide 182 is opened, and at least the sprocket 102 of the first feed mechanism 94 and the nip roller pair 180 of the second feed mechanism 96 are actuated. Therefore, the defective portion of the elongate film F is fed to a position downstream of the cutting mechanism 92 by the sprocket 102 and the nip roller pair 180. After the first and second feed mechanisms 94, 96 are inactivated, the cutting mechanism 92 is actuated.

In the cutting mechanism 92, the drive shaft 124 is stopped, and the second cylinder 157 is actuated as shown in FIG. 6. The swing link 158 is angularly moved to move the vertically movable base 108 downwardly. The movable blade 106 is lowered to cut off the defective portion of the elongate film F with the movable blade 106 and the fixed blade 104. At this time, the discharge port 250 has been moved over the film feed path. When the air blower 259 is actuated, the defective film F is attracted by the discharge port 250 and continuously drawn in its entirety through the discharge chute 252 into the accumulation chamber 256 within the discharge box 254. Therefore, the defective portion of the elongate film F can automatically be discharged efficiently. Any sized film 16 with a defective portion will not be wound on a spool 20, and hence packaged products 12 have increased quality.

In the first embodiment, the plural spool chuck mechanisms 264 are mounted on the first turntable 262, and each of the spool chuck mechanisms 264 is mechanically operated to hold and release a spool 20 by the cam mechanism 274 in response to being placed in the spool supply station ST1 and the transfer station ST6 each serving as a spool holding and releasing station.

The cam mechanism 274 has the first cam member 322 fixed to the column 330 which supports the distal end of the main shaft 260 rotatable in unison with the first turntable 262, the swing arm 310 swingably mounted on the first turntable 262 in sliding contact with the cam surface 324 of the first cam member 322, and the first and second cam mechanisms 329a, 329b for moving the swing arm 310 along the cam log surface 324. Therefore, simply by establishing the profile of the cam surface 324 of the first cam member 322, the spool chuck mechanism 264 can hold and release a spool 20 in synchronism with other mechanical operations in response to being moved to the spool supply station ST1 and the transfer station ST6.

Consequently, various actions in the sequence can easily be timed, and the overall operation can reliably be speeded up with a simple arrangement. Particularly, since the spool chuck mechanisms 264 are mechanically opened and closed by the cam mechanism 274, their durability is much larger than if an actuator such as a solenoid or the like were employed.

As shown in FIG. 18, each of the spool chuck mechanisms 264 is of a unitized construction, and removably mounted on an outer circumferential facet of the first turntable 262 by the positioning assembly 265. Specifically, the positioning pins 267a, 267b on the first turntable 262 are fitted in the respective engaging holes 266a, 266b defined in ends of the support blocks 266, and the screws 271a, 271b are inserted in the attachment holes 266c, 266d in the support blocks 266, and threaded into the threaded holes 269a, 269b in the first turntable 262 for thereby fastening the spool chuck mechanisms 264 on the outer circumferential facets of the first turntable 262. Therefore, the spool chuck mechanisms 264 can be installed on and detached from the first turntable 262 highly simply, and the spool chuck mechanisms 264 can be positioned on the first turntable 262 highly accurately for increased assembling accuracy and integrity.

In each of the spool chuck mechanisms 264, the opposite ends of the spool 20 are held by the holder shaft 286 and the rotatable sleeve 308, and the holder shaft 286 has the cylindrical body 296 held against an end face of the spool 20, and the rotatable pin 300 which can be pressed against the end face of the spool 20 under the bias of the spring 298 in the cylindrical body 296. Therefore, the rotatable pin 300 can reliably engage the end of the spool 20, and the spool 20 can reliably be rotated at high speed by the motor 306 of the spool rotating mechanism 292.

As shown in FIG. 19, the key 20c in an end of the spool 20 is fitted in the groove 302 in the distal end of the rotating pin 300, and the opening of the groove 301 has a dimension that differs from the thickness of the key 20c by a range from +0.7 mm to +0.9 mm. Thus, the key 20c and the groove 301 can transmit rotation without a reduction in rotation transmitting accuracy due to wobbling movement. After the sized film 16 has been wound around the spool 20, the trailing end of the sized film 16 is prevented from projecting beyond a predetermined length. The groove 301 has the outwardly spreading tapered ends 303 for guiding the key 20c smoothly and reliably into the groove 301.

The rotatable pin 300 is engaged by the spring 298 which has a spring force that is maintained in a range from 250 gf to 450 gf. Therefore, the rotatable pin 300 can effectively be moved back and forth under the bias of the spring 298, for preventing the spool 20 and the spool rotating mechanism 292 in the engaging position from being unduly damaged.

Each of the spool chuck mechanisms 264 has the mechanical clutch 280 for transmitting rotational forces of the spool rotating mechanism 292, the prewinding mechanism 444, and the winding mechanism 446 to the holder shaft 286. For example, as shown in FIG. 25, when the sleeve 418 of the spool rotating mechanism 292 is moved toward the first support assembly 268 of the spool chuck mechanism 264 by the cam mechanism 394, the clutch drive sleeve 422 fixed to the sleeve 418 presses the clutch sleeve 282 to make the holder shaft 286 rotatable, and brings the clutch member 426 into mesh with the clutch member 288. When the motor 406 is energized, rotational forces are transmitted from the rotatable shaft 414 directly to the holder shaft 286 for thereby rotating the spool 20.

Since the spool rotating mechanism 392 is coupled to the first support assembly 268 through the mechanical clutch 280, the transmitting mechanism is made effectively more durable and higher in speed than other transmitting mechanisms such as a belt and pulleys, and the spool 20 can be rotated highly accurately. In the first embodiment, the spool 20 can be held on the first turntable 262 highly accurately and reliably, and the sized film 16 can be wound around the spool 20 at high speed to produce a highly accurate film coil 32. The various actions in the sequence can easily be timed for high-speed operation because they are timed by the cam mechanism 274, etc.

Figure 33:
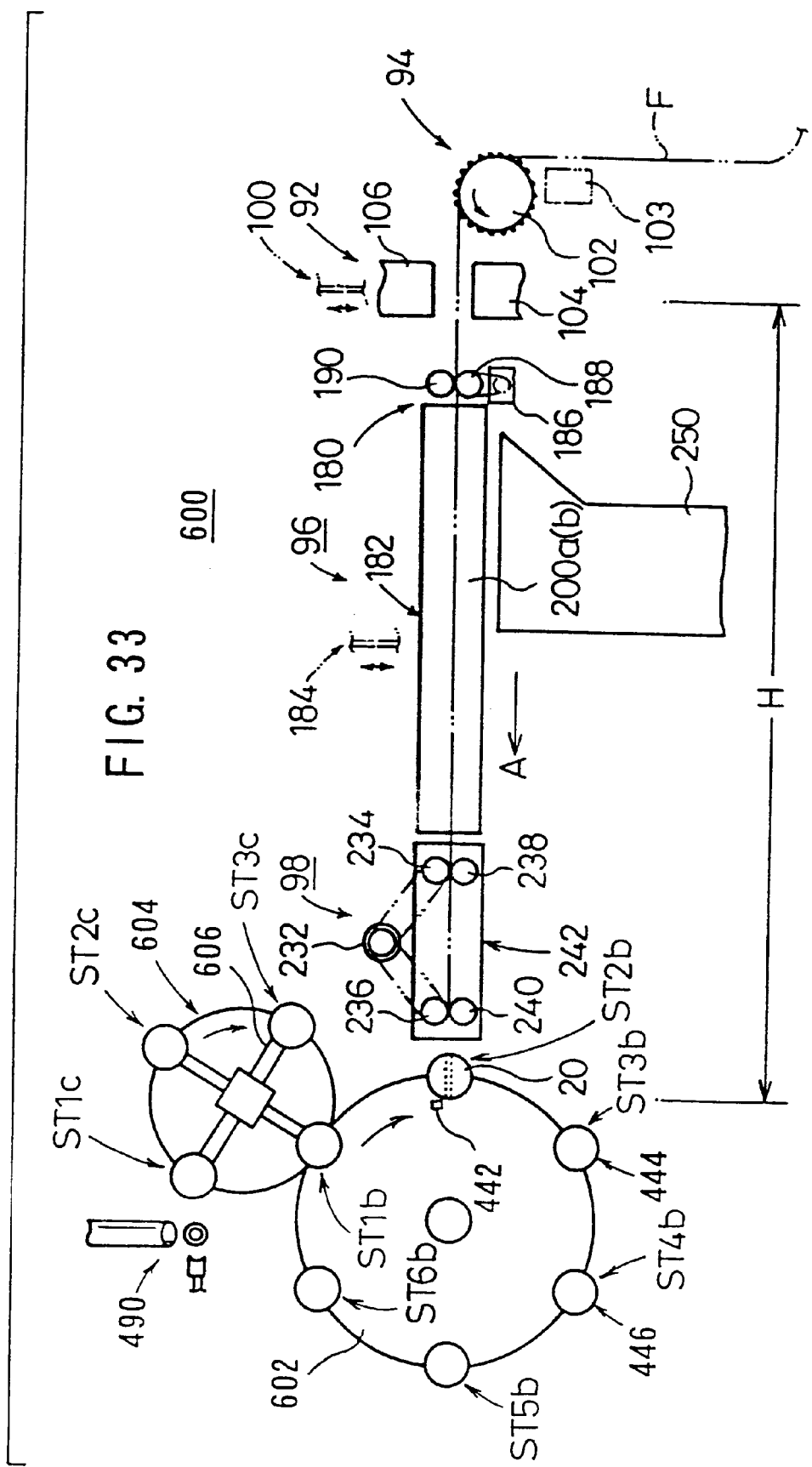
FIG. 33 is a schematic view of a cutting and inserting device according to a second embodiment of the present invention.

FIG. 33 schematically shows a cutting and inserting device 600 as a processing device according to a second embodiment of the present invention. Those parts of the cutting and inserting device 600 which are identical to those of the cutting and inserting device 90 according to the first embodiment are denoted by identical reference characters, and will not be described in detail below.

In the cutting and inserting device 600, a first turntable 602 has thereon a spool supply station ST1*b*, an inserting station ST2*b*, a prewinding station ST3*b*, a winding station ST4*b*, a film coil inspecting station ST5*b*, and a transfer station ST6*b* which are successively angularly positioned clockwise (in the direction indicated by the arrow) in the order named.

A spool positioning supply unit 604 is positioned in partly overlapping relation to the spool supply station ST1*b* of the first turntable 602. The spool positioning supply unit 604 comprises a second turntable 606 having thereon a spool receiving station ST1*c*, a spool positioning station ST2*c*, a spool inspecting station ST3*c*, and the spool supply station ST1*b*. In the second embodiment, the spool positioning supply unit 604 positions a spool 20 and inspects the spool 20 for its properties including its positioning. Thereafter, the spool 20 is transferred to the spool chuck mechanism 264 on the first turntable 602. After having received the spool 20 which has been positioned and inspected in the spool supply station ST1*b*, the first turntable 602 delivers the spool 20 to the inserting station ST2*b* where a sized film 16 is inserted into the spool 20.

In the cutting and inserting device 600 according to the second embodiment, the sized film 16 is inserted into only the spool 20 which has been inspected for its properties including its positioning. Thus, an expensive sized film 16 is prevented from being wound around a defective spool 20. The cutting and inserting device 600 according to the second embodiment offers the same advantages as those of the cutting and inserting device 90 according to the first embodiment, i.e., is capable of cutting and inserting films economically and efficiently.

In the method of and apparatus for processing a film according to the present invention, the cutting mechanism is selectively operated by the first and second cam assemblies depending on the length of a preset sized film. A process of cutting off a photographic photosensitive film and a process of inserting an end of the photographic photosensitive film into a spool can easily be selected, so that sized films of various different lengths can easily be handled with a highly simple arrangement.

According to the present invention, before a spool is delivered to an inserting station for inserting a photographic photosensitive film, the spool is inspected to check if it is positioned or not. Consequently, a photographic photosensitive film can smoothly, reliably, and efficiently be inserted into the spool. A photographic photosensitive film is prevented from being inserted into a defective spool and hence an expensive photographic photosensitive film is prevented from being discarded as a defective product. Therefore, a photographic photosensitive film is handled highly economically.

Furthermore, each of the spool chuck mechanisms mounted on the turntable is mechanically opened and closed by the cam mechanism which operates in response to the movement of the spool chuck mechanism to the spool holding and releasing station. Therefore, the spool chuck mechanism can hold and release the spool effectively with a simple arrangement. The various actions in the sequence can easily be timed, and the high-speed operation and durability of the apparatus can be increased.

Although certain preferred embodiments of the present invention have been shown and described in detail, it should be understood that various changes and modifications may be made therein without departing from the scope of the appended claims.

What is claimed is:

1. An apparatus for processing a film by inserting an end of a photographic photosensitive film having a preset length into a spool and rotating said spool to wind said photographic photosensitive film therearound, comprising:

a turntable which is intermittently rotatable;

a plurality of spool chuck mechanisms mounted on said turntable at angularly spaced intervals, for holding said spool, each of said spool chuck mechanisms having a swingable presser roller for holding the end of the photographic photosensitive film wound around the spool, and cam means for mechanically moving said presser roller toward and away from said end of the photographic photosensitive film in response to rotation of said turntable;

an inserting mechanism for inserting the end of the photographic photosensitive film into the spool held by one of said spool chuck mechanisms;

a spool rotating mechanism for rotating the spool held by the spool chuck mechanism; and cam mechanisms for mechanically opening and closing said spool chuck mechanisms in response to movement of said spool chuck mechanisms to a spool holding and releasing station, wherein each of said spool chuck mechanisms is of a unitized construction and removably mounted on said turntable by a positioning assembly.

2. An apparatus according to claim 1, wherein each of said spool chuck mechanisms comprises:

first support means for supporting an end of the spool, said first support means being rotatable in unison with the spool while the spool is being rotated by said spool rotating mechanism; and second support means for rotatably supporting an opposite end of said spool;

said first support means having a holder shaft for engaging an end face and outer circumferential surface of a first boss on an end of said spool, said holder shaft serving as a positioning reference;

said second support means having a rotatable sleeve for engaging an end face and outer circumferential surface of a second boss on an opposite end of said spool.

3. An apparatus according to claim 2, wherein said first support means has a spring for pressing said holder shaft toward said spool.

4. An apparatus according to claim 3, wherein said holder shaft comprises:

a cylindrical body for abutting against the end of said spool; and a rotatable pin axially movable in said cylindrical body with a spring acting thereon, for engaging the end of said spool and rotating said spool in unison with said cylindrical body.

5. An apparatus according to claim 4, wherein said rotatable pin has a groove for receiving a key disposed in the end of said spool.

6. An apparatus according to claim 2, further comprising:

cam means for moving said spool rotating mechanism toward and away from said first support means; and a mechanical clutch for releasably coupling said spool rotating mechanism and said first support means to each other.

7. An apparatus according to claim 1, further comprising:

a rotating and positioning mechanism for positioning said spool;

an engaging finger for engaging a step of said spool when said spool is rotated by said spool rotating mechanism;

an arm for supporting said engaging finger tiltably via a spring; and cam means for angularly moving said arm with respect to the spool.

8. An apparatus according to claim 1, wherein the swingable presser roller operates to hold the end of the photographic photosensitive film only after the photographic photosensitive film has been wound around the spool.

9. An apparatus according to claim 8, further comprising a touch roller for pressing on the photographic photosensitive film while the photographic photosensitive film is being wound around the spool.

10. An apparatus according to claim 1, further comprising a touch roller for pressing on the photographic photosensitive film while the photographic photosensitive film is being wound around the spool.

* * * * *